United States Patent [19]

Ahnen et al.

[11] Patent Number: 4,791,662
[45] Date of Patent: Dec. 13, 1988

[54] CONTROLLING KEY-SYSTEM GROUPS FROM A DISTRIBUTED CONTROL SWITCHING SYSTEM

[75] Inventors: David J. Ahnen, Aurora; Charles O. Akanbi, Chicago; Ian D. Bruce, Winfield; Jacqueline C. Kramer, Warrenville; Carolyn D. Larson; Wei-Chen Ni, both of Naperville; Annetta T. Owens, Aurora, all of Ill.

[73] Assignee: American Telephone and Telegraph Company, AT&T Bell Laboratories, Murray Hill, N.J.

[21] Appl. No.: 77,531

[22] Filed: Jul. 23, 1987

[51] Int. Cl.⁴ .......................... H04Q 5/20; H04M 3/56
[52] U.S. Cl. .................................... 379/158; 379/165; 379/269; 379/274
[58] Field of Search ............... 379/156, 159, 160, 165, 379/166, 158, 219, 225, 269, 274

[56] References Cited

U.S. PATENT DOCUMENTS

| | | | |
|---|---|---|---|
| 3,643,032 | 2/1972 | Ulrich et al. | 179/18 ES |
| 3,860,761 | 1/1975 | O'Neill, Jr. | 179/18 J |
| 4,256,926 | 3/1981 | Pitroda et al. | 179/18 ES |
| 4,259,549 | 3/1981 | Stehman | 179/18 ES |
| 4,317,962 | 3/1982 | Cox et al. | 179/18 ES |
| 4,322,843 | 3/1982 | Beuscher et al. | 370/63 |
| 4,339,633 | 7/1982 | Ahmed | 179/99 M |
| 4,340,776 | 7/1982 | Ganz et al. | 178/3 |
| 4,421,955 | 12/1983 | Mori et al. | 179/18 EA |
| 4,442,321 | 4/1984 | Stehman | 179/18 EB |
| 4,550,404 | 10/1985 | Chodrow et al. | 370/110.1 |
| 4,588,864 | 5/1986 | Carter et al. | 179/99 H |
| 4,607,144 | 8/1986 | Carmon et al. | 179/99 H |
| 4,644,528 | 2/1987 | Ahmad et al. | 370/58 |
| 4,694,487 | 9/1987 | Chang et al. | 379/269 |

OTHER PUBLICATIONS

H. Takeda et al., "Time Division Switching Control System", Review of the Electrical Communication Laboratories, vol. 27, Number 9-10, Sep.-Oct. 1979, pp. 773-782.
G. Becker et al., "Call Processing in a Distributed Control System", ICC '80 Conference Record, vol. 3 of 3, Jun. 8-12, 1980, pp. 46.4.1-46.4.7.
D. Jackson and K. Patfield, "Impacts of Multiprocessing on GTD-5 EAX Call Processing and Operating System", ISS '81 CIC Montreal, Sep. 21-25, 1981, pp. 1-7.
M. Akiyama et al., "Time Division Distributed Switching System", ISS '81 CIC Montreal, Sep. 21-25, 1981, pp. 1-7.
"An Introduction to AT&T System 85", Issue 1, Jan., 1987, pp. 1-81.

Primary Examiner—Jin F. Ng
Assistant Examiner—Wing Fu Chan
Attorney, Agent, or Firm—Ross T. Watland

[57] ABSTRACT

A distributed control switching system where calls, to and from a directory number that is shared by a key-system group of terminals, are processed cooperatiavely by multiple, distributed control units but in response to busy/idle data for the shared directory number stored advantageously by only a lead one of the control units. In addition to processing a call, for example to complete a connection to or from one of the terminals of the group, the multiple control units also cooperate as the call progresses to inform each of the group terminals of the call status as though the terminals were connected in parallel to a central office line as in an electromechanical key system.

24 Claims, 23 Drawing Sheets

CONTROL UNIT 111     CONTROL UNIT 121

OTP1

SCSP121

| PID=OTP1 | DALB181 |
| --- | --- |
| LEAD CONTROL UNIT=121 | |
| | PCBLA_KEY=OTP1 |

| BRCS181 | |
| --- | --- |
| ASSOC=NO | SHAR=YES |

SETUP

181

182

183

CONTROL UNIT 111 | CONTROL UNIT 121

← MGZIDLED
← MGZLTMID
← MGZFIN

SCSP121

REL_CMP          REL_CMP

PID=OTP1
DALB182
PCBLA_KEY=NULL

BRCS182
ASSOC=YES | SHAR=YES

PID=OTP1
DALB183
PCBLA_KEY=NULL

BRCS183
ASSOC=YES | SHAR=YES 181   182   183

CONTROL UNIT 111

CONTROL UNIT 121

181

182

183

CONTROL UNIT 111

CONTROL UNIT 121

181

182

183

CONTROLLING KEY-SYSTEM GROUPS FROM A DISTRIBUTED CONTROL SWITCHING SYSTEM

BACKGROUND OF THE INVENTION

Several arrangements exist for accessing a plurality of telephone central office lines from a single station set. The oldest and most commonly used arrangement is an electromechanical key telephone where several central office lines are brought into a single station, connection between the central office lines and the telephone apparatus being made mechanically through a switch. In a typical key telephone, several central office lines are brought in parallel into a single telephone station, and the station is equipped with keys and switches in order to connect each of the central office lines, one line at a time, with a single telephone apparatus. Because several stations typically must have access to the same central office lines a key telephone system includes a distribution box which distributes the tip and ring wires from each central office line, in parallel, to the several telephone stations. When several stations share several central office lines, visual indicators are associated with the keys for signaling purposes to identify, for example, which central office line is ringing, which line is engaged, or which line is on hold.

An alternative arrangement is the electronic key system in which each telephone apparatus is accessed by only one pair of tip and ring wires. Switching between the various central office lines and the telephone stations is done in a central, electronically controlled switching matrix located in an electronic key service unit. Typically, the telephone station contains keys which enable the user to identify to the switching matrix which central office line the user wishes to have connected to that station. Signaling and visual status indicators are made available to stations via additional wires, which carry the necessary electronic signals to perform the central office line selection and control, and to turn on and off the visual indicators.

Although key-system services are popular among a large class of customers, the provision of specialized wiring and distribution arrangements for key-system stations is expensive and inflexible. A recent approach to the provision of key-system services is to connect each station via an individual line to a stored program controlled, central office or private branch exchange (PBX) switching system and to have the central control of that system coordinate the processing of calls to and from members of key-system groups. Accordingly, no specialized wiring or distribution arrangements are required for the key-system stations. Key-system group control becomes much more complex in such switch-based arrangements, however, when the control is distributed to a plurality of switching modules to reduce the involvement of the system central control in per-call tasks. This is particularly true in typical applications where it is important that the members of a key-system group can be spread across a number of switching modules to enhance reliability and for administrative convenience in changing group members.

In view of the foregoing, a recognized problem in the art is the difficulty in controlling key-system groups from a switching system without relying on a central control.

SUMMARY OF THE INVENTION

The aforementioned problem is solved and a technical advance is achieved in accordance with the principles of the invention in a distributed control switching system where calls, to and from a directory number that is shared by a key-system group of terminals, are processed cooperatively by multiple, distributed control units but in response to busy/idle data for the shared directory number stored advantageously by only a lead one of the control units. In addition to processing a call, for example to complete a connection to or from one of the terminals of the group, the multiple control units also cooperate as the call progresses to inform each of the group terminals of the call status as though the terminals were connected in parallel to a central office line as in an electromechanical key system.

A method in accordance with the invention is used in a distributed control switching system serving a plurality of terminals. The system has a number of control units each associated with a different subset of the terminals; each control unit controls connections to and from its associated subset of terminals. Calls to and from a directory number shared by a key-system group of terminals associated with multiple control units are processed as follows. A lead control unit maintains busy/idle data for the shared directory number. The lead control unit reads the busy/idle data in response to the calls, and the multiple control units respond to such read data by cooperatively processing the calls. During each call, the multiple control units cooperatively inform the group of terminals of the status of the call.

For a call originating from a shared directory number of an originating terminal of the group, the processing of the call is initiated by the control unit associated with the originating terminal. If setup signals are received from multiple terminals of the group, a system connection is established from only one of the terminals. After a system connection is completed from an originating terminal to a terminating terminal, another terminal of the group can be bridged with the originating terminal for conference connection to the terminating terminal.

For a terminating call to the shared directory number, the multiple control units cooperatively offer the terminating call to the group of terminals. A translation of the shared directory number is performed to define a lead terminal of the group. The lead terminal is associated with the lead control unit for the group. An initial system connection is controlled from the originating terminal to the lead terminal in response to the translation. When a connect signal is received from the lead terminal, the initial connection is completed to the lead terminal. However, when a connect signal is instead received from a non-lead terminal of the group, the initial connection to the lead terminal is removed and a second system connection is completed from the originating terminal to the non-lead terminal. If connect signals are received from multiple terminals of the group, a system connection is completed to only one of the terminals. After a system connection is completed from an originating terminal to a terminating terminal, another terminal of the group can be bridged with the terminating terminal for conference connection to the originating terminal.

A directory number may have several call appearances each of which may be used for a different call. The terminals of a key-system group may have a number of call appearances of the shared directory number.

For a given call to the shared directory number, the lead control unit determines an idle one of the call appearances. The multiple control units then cooperatively offer the call to terminals of the group having the determined call appearance.

DETAILED DESCRIPTION

Figure 1:
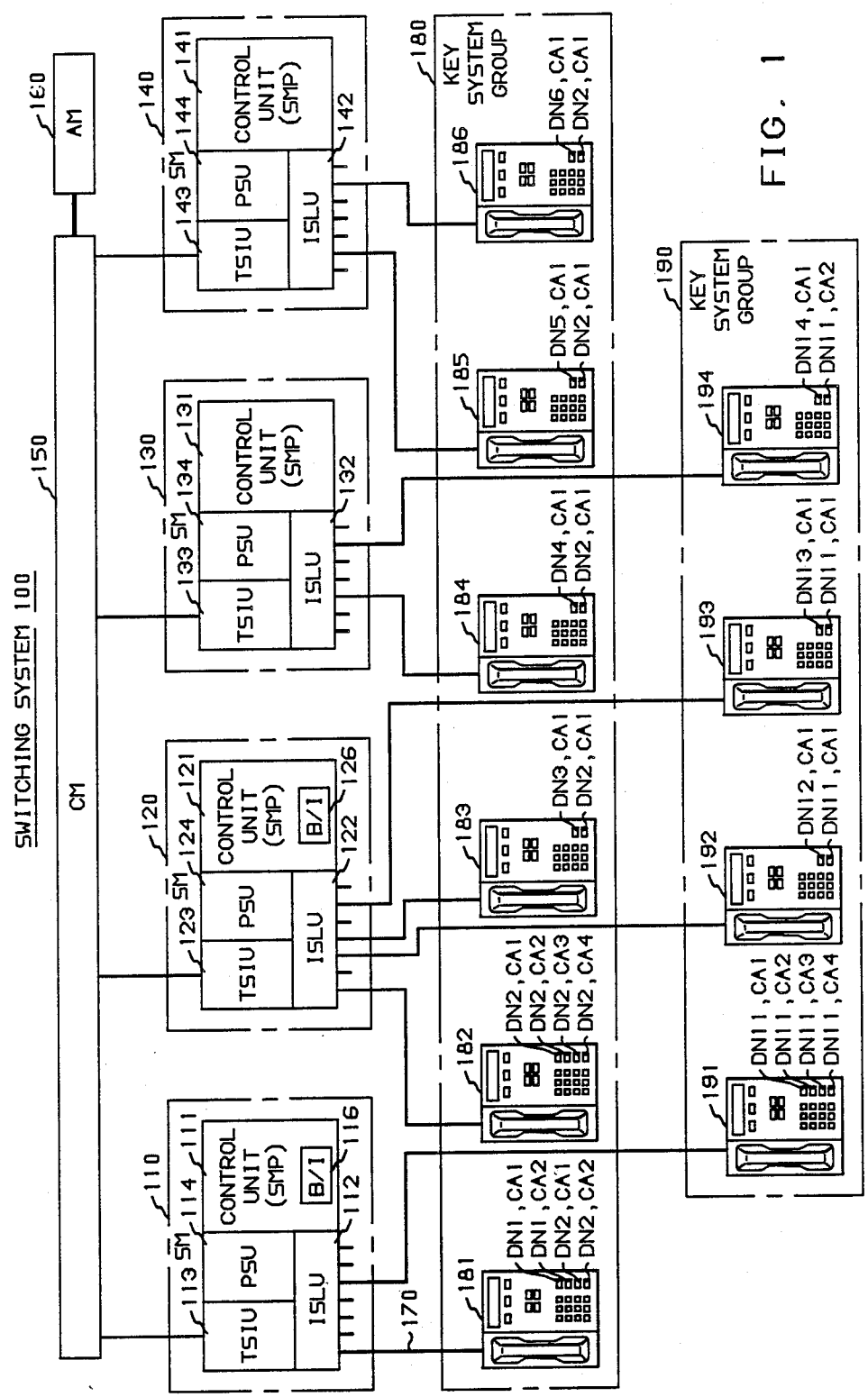
FIG. 1 is a block diagram of an illustrative, distributed control switching system that controls key-system groups of terminals in the manner of the present invention.
Figure 2:
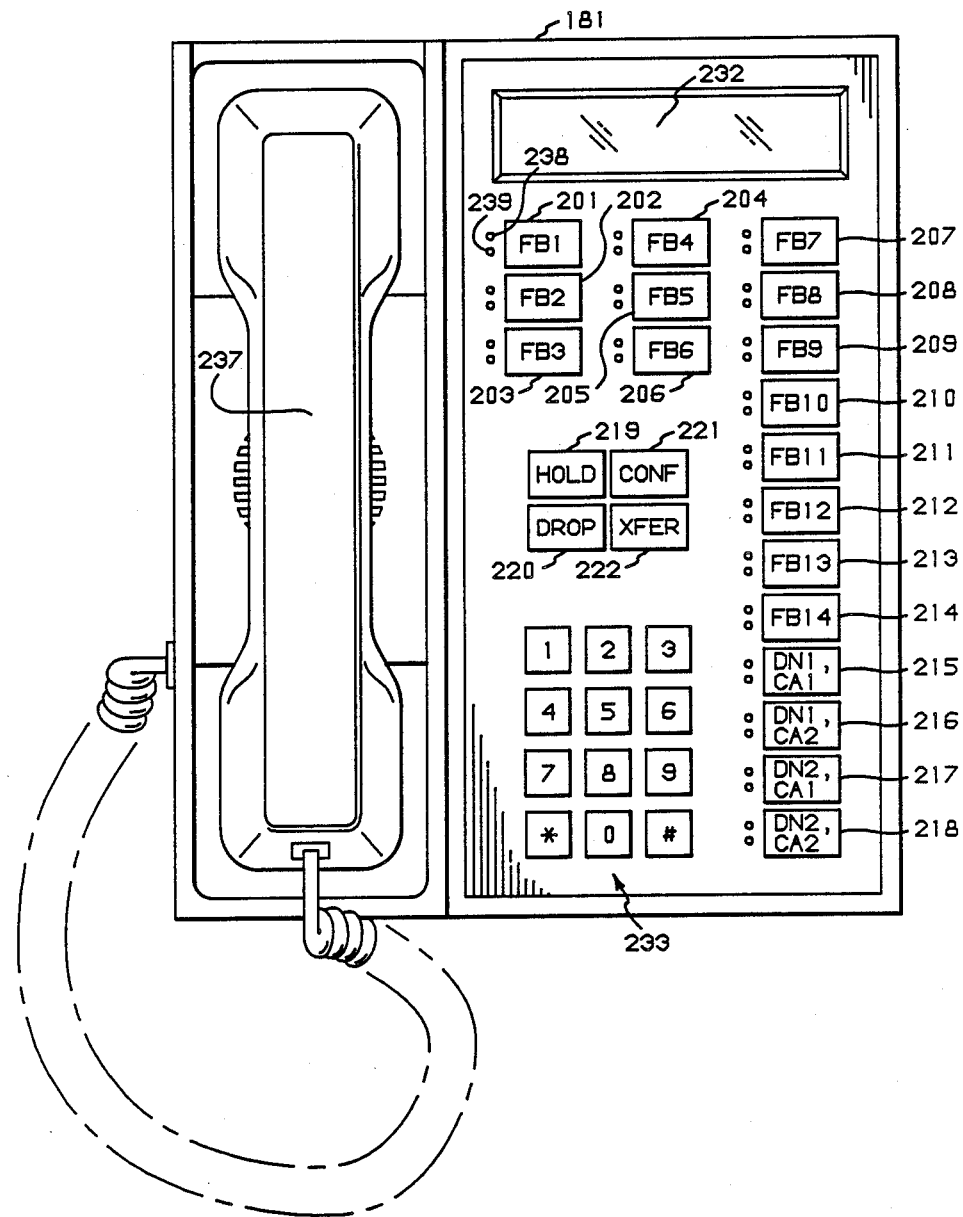
FIG. 2 is a more detailed depiction of one of the terminals of FIG. 1.

The principles of the invention are described in the context of a distributed control, integrated services digital network (ISDN) switching system 100 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. System 100 is connectable to analog or digital terminals, however, only digital ISDN terminals 181 through 186 and 191 through 194 are shown in FIG. 1. (Although not shown in FIG. 1, system 100 is also connectable via trunks to terminals associated with other switching systems.) System 100 includes a number of switching modules (SMs) each associated with a different subset of terminals. For example, switching module 110 is associated with terminals 181 and 191, switching module 120 is associated with terminals 182, 183, 192 and 193, switching module 130 is associated with terminals 184 and 194, and switching module 140 is associated with terminals 185 and 186. Each switching module includes a control unit or switching module processor (SMP) for controlling connections to and from its associated subset of terminals. Switching module 110, for example, includes control unit 111 for controlling connections to and from terminals 181 and 191. Similarly, switching modules 120, 130, and 140 include control units 121, 131, and 141, respectively.

Each ISDN user terminal communicates with system 100 in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) The D-channel is used both to convey signaling packets to effect message signaling between ISDN terminals and switching module control units, and to convey data packets between different ISDN terminals.

In the present exemplary embodiment, information is conveyed between an ISDN terminal and system 100 using a four-wire, digital subscriber line (DSL) 170 using one pair of wires for each direction of transmission. DSL 170 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. DSL 170 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between terminals and the switching module control units enclosed in level 2 (link-level) frames in accordance, for example, with the standard LAPD protocol. The exemplary signaling messages used for the control of circuit-switched voice calls are in accordance with CCITT recommendation Q.931.

The architecture of system 100 has a communications module (CM) 150 as a hub, with the switching modules 110, 120, 130, and 140, and an administrative module (AM) 160 emanating therefrom. Each switching module includes an integrated services line unit (ISLU) which terminates the digital subscriber lines and provides access to a time-slot interchange unit (TSIU) and a packet switching unit (PSU). For example, in switching module 110, ISLU 112 terminates the digital subscriber lines, and TSIU 113 and PSU 114 respectively provide circuit-switched and packet-switched connections to and from the associated terminals under the control of control unit 111. Switching modules 120, 130 and 140 similarly include ISLUs 122, 132, and 142, TSIUs 123, 133, and 143, and PSUs 124, 134, and 144.

Communications module 150 includes a time-shared, space-division switch or time-multiplexed-switch, that provides 64 kilobits per second circuitswitched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 160 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

An exemplary ISDN terminal 181 is shown in FIG. 1. Terminal 181 includes a handset 237, a telephone keypad 233 and a display 232 for visually displaying messages. Terminal 181 also includes 22 buttons 201 through 222. Buttons 219 through 222 are only used for the HOLD, DROP, CONFERENCE and TRANSFER functions. The remaining buttons are configured at terminal 181 such that buttons 201 through 214 are feature buttons and buttons 215 through 218 are call appearances. However, the identical terminal could be configured to meet different user requirements, for example such that buttons 201 through 206 are call appearances and button 207 through 218 are feature buttons. Each call appearance or feature button has associated in-use and status lamps. For example, button 201 has associated in-use lamp 238 and status lamp 239. The in-use lamp is lit for a call appearance when that call appearance is the selected call appearance at the terminal. The status lamp is used to indicate the various stages of the call, alerting, active, etc., or to indicate the activation of feature buttons.

The terminals shown in FIG. 1 comprise two key-system groups 180 and 190. A key-system group is a set of terminals that share one or more call appearances for a single directory number (DN). The dynamic busy/idle status information for a key-system group is stored by the control unit of the switching module connected to a lead terminal of the group. Each terminal has a primary DN. If a group shared DN is primary at any terminal, that terminal is selected as the lead terminal. The lead terminal has the maximum number of call appearances for the shared DN. If the group shared DN is not primary at any terminal, then the lead terminal is selected as follows. If one terminal of the group has more call appearances of the shared DN than any of the other group terminals, the terminal having more call appearances is selected as the lead terminal. If multiple terminals of the group each have the same maximum number of call appearances of the shared DN but one of those terminals is on a switching module that has more call appearances of the shared DN than the other terminals, the terminal on the switching module having more call appearances is selected as the lead terminal. If multiple terminals of the group each have the same maximum number of call appearances of the shared DN are on switching modules having the same number of call appearances of the shared DN, one of the multiple terminals is arbitrarily selected as the lead terminal. The control unit that stores the busy/idle status information for a key-system group is referred to herein as the lead control unit. The lead control unit is the control unit of the switching module connected to the lead terminal.

Key-system group 180 comprises terminals 181 through 186, having primary DNs DN1 through DN6 respectively. DN2 is the shared DN for group 180, terminal 182 is the lead terminal and control unit 121 is the lead control unit. Terminal 182 has the maximum number of call appearances for DN2, four. The dynamic busy/idle status information for the four call appearances of DN2 is stored in a busy/idle table 126 of lead control unit 121. Key-system group 190 comprises terminals 191 through 194, having primary DNs DN11 through DN14 respectively. DN11 is the shared DN for group 190, terminal 191 is the lead terminal and control unit 111 is the lead control unit. Terminal 191 has the maximum number of call appearances for DN11, four. The dynamic busy/idle status information for the four call appearances of DN11 is stored in a busy/idle table 116 of lead control unit 11.

The processing of calls to and from terminals of key-system groups is performed cooperatively by the control units associated with those terminals. The overall processing task is broken down into a number of major tasks called program processes. A process comprises a collection of procedures, each performing some subtask of the process. Associated with a process is a block of memory called a process control block which stores data applicable to the entire process, and a block of memory called a stack which stores data useful to the individual procedures of the process. Processes can be further broken down into subprocesses called models. Processes (and models) communicate with each other via messages. The same type of message is used in communicating with another process in the same processor, or another process in a different processor. In system 100, processes are of two types: terminal processes and system processes. System processes remain in existence as long as the system is operational. Terminal processes on the other hand remain in existence only for the duration of individual calls or service events such as diagnostic tests or service evaluation.

Figure 3:
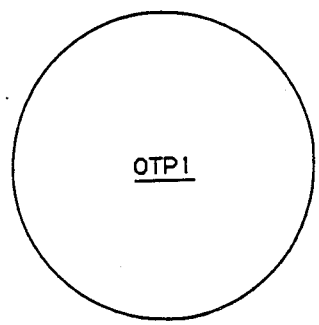
FIGS. 3 through 15 are functional diagrams illustrating processing of originating key-system calls by distributed control units of the system of FIG. 1.
Figure 3:
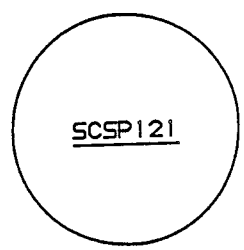
Figure 3:
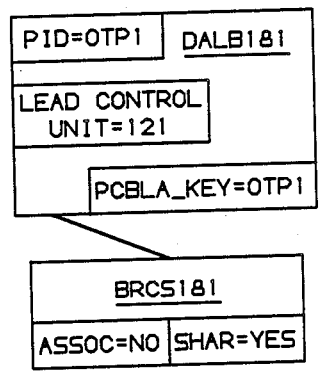
Figure 3:
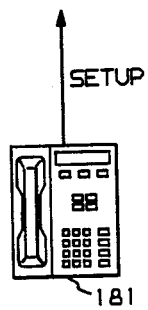
Figure 3:
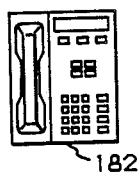
Figure 3:
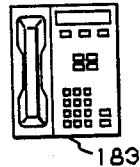

The call processing events associated with call originations from a key-system group are now described with reference to an exemplary call from terminal 181, DN2, CA1. A SETUP message from terminal 181 is received by control unit 111. In response to the SETUP message, control unit 111 creates an originating terminal process (OTP), OTP1 (FIG. 3), and stores data relevant to terminal 181 and key-system group 180 in two data blocks DALB181 and BRCS181 for quick reference during the call. Block DALB181 stores a variable pid defining process OTP1 as the terminal process controlling the call origination, a variable defining control unit 121 as the lead control unit for the group, and a variable pcbla_key defining process OTP1 as the terminal process associated with terminal 181. Block BRCS181 stores a variable assoc defining that terminal 181 is not presently an associated terminal of the key-system group, and a variable shar defining that terminal 181 shares the originating directory number with the other terminals of the group. (During a call, terminals of the group may be either active, meaning that they are actively involved on the call, or associated meaning that they are merely being informed of the call status.) Each control unit associated with terminals belonging to key-system groups has a single shared call system process (SCSP) used to coordinate the communications with all such terminals. Process SCSP121 of control unit 121 is shown in FIG. 3.

Figure 4:
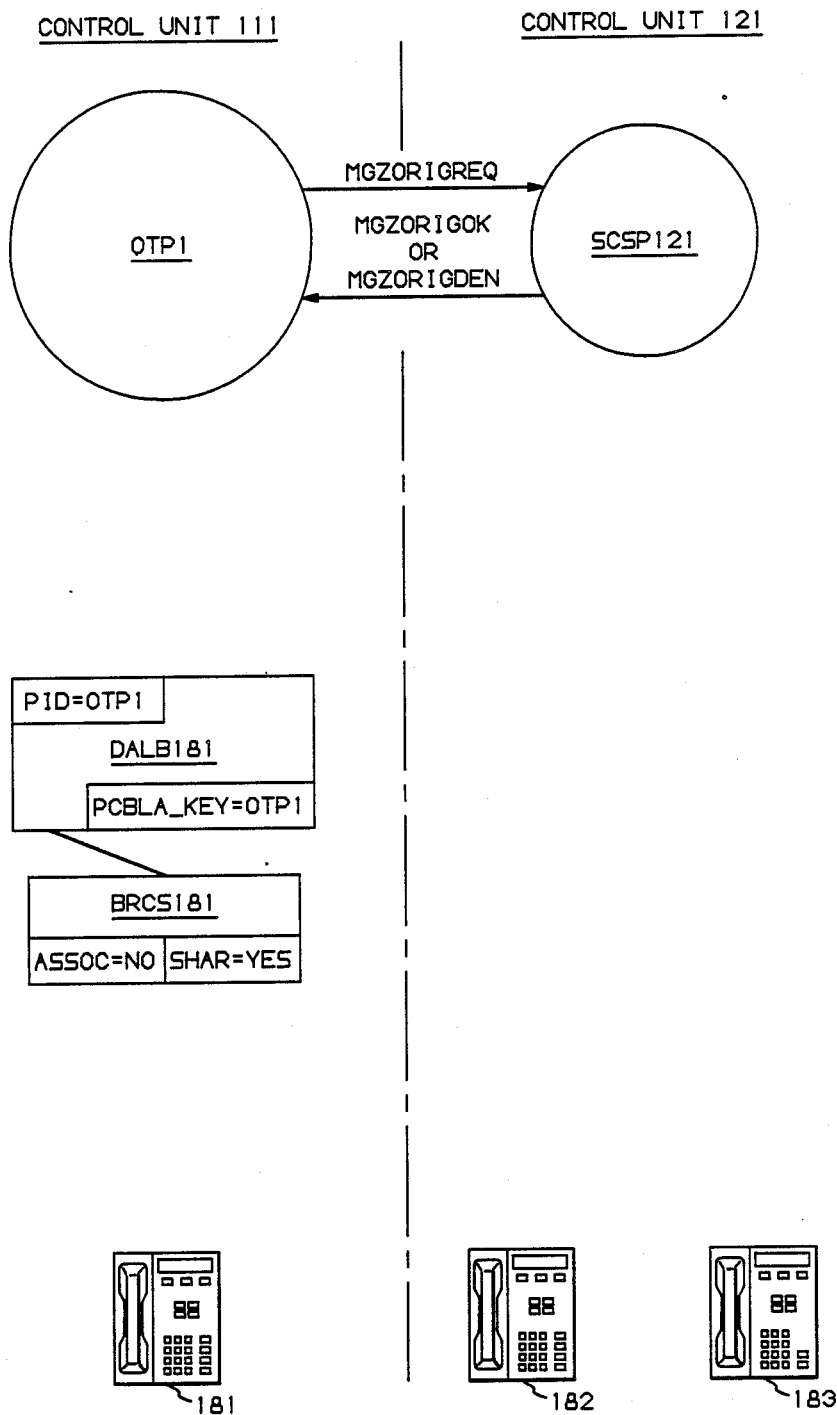
Figure 5:
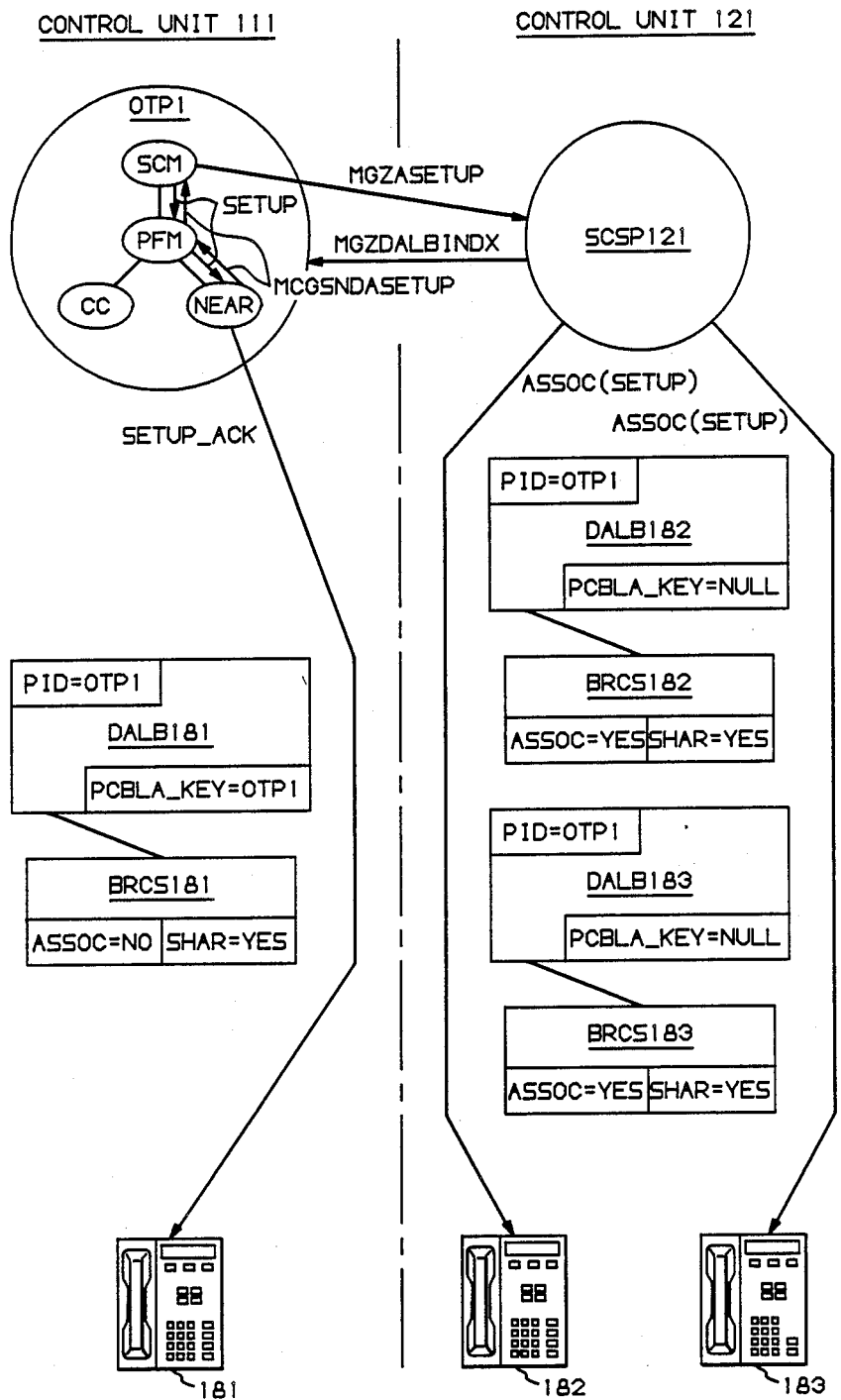

Once process OTP1 and data blocks DALB181 and BRCS181 have been created, process OTP1 transmits a MGZORIGREQ message (FIG. 4) defining the origination request to process SCSP121 of lead control unit 121. Process SCSP121 reads the busy/idle data for DN2, CA1 stored in table 126 (FIG. 1). If the read data indicates that DN2, CA1 is presently idle, process SCSP121 changes such data to indicate a busy status and returns a MGZORIGOK message to process OTP1. However, if the read data indicates that DN2, CA1 is presently busy, process SCSP121 returns a MGZORIGDEN message to process OTP1 and the origination request is denied. Accordingly, near simultaneous origination attempts by multiple terminals of the group will result in all but the first origination being denied. In response to the MGZORIGOK message, process OTP1 creates a number of models (FIG. 5) therein to effect various call processing functions: (1) a shared call model SCM to control the origination from the shared DN, (2) a POTS (plain old telephone service) feature model PFM, (3) a model NEAR to control communication with terminal 181 concerning the originating half of the call, and (4) a model CC to control communication with a terminating terminal process at the far end of the call. Model SCM sends a SETUP message via model PFM to model NEAR which effects the transmission of a SETUP_ACK message to terminal 181 and sends a MCGSNDASETUP message via model PFM to model SCM. Model SCM in turn transmits a MGZASETUP message to the shared call system process in each of the other control units of the key-system group. The MGZASETUP message transmitted to process SCSP121 in control unit 121 is shown in FIG. 5.

In response to the MGZASETUP message, process SCSP121 allocates, links, and initializes blocks DALB182, BRCS182, DALB183, and BRCS183 for terminals 182 and 183. Note that the variable pcbla_key in blocks DALB182 and DALB183 is NULL, since those blocks are not associated with a terminal process. The variable pid defines process OTP1 as the process with which terminals 182 and 183 are to communicate. Process SCSP121 determines an index for each of the blocks DALB182 and DALB183 and returns the indices to process OTP1 in a MGZDALBINDX message, for efficient subsequent access of those blocks from process OTP1. Process SCSP121 also transmits ASSOC(setup) messages to terminals 182 and 183 informing them that one of the other terminals of the group is originating a call on DN2, CA1. Terminals 182 and 183 both return ASSOC_ACK messages to process OTP1 (FIG. 6) by way of a message communication process (not shown) in control unit 121. At the time that process OTP1 transmitted the MGZASETUP message to process SCSP121 (FIG. 5), process OTP1 initialized a timer. If any of the associated terminals of the group have not returned ASSOC_ACK messages within a predetermined time, four seconds, process OTP1 transmits second MGZASETUP messages to the SCSPs of the non-acknowledging terminals and reinitializes the timer. The second MGZASETUP messages specify the non-acknowledging terminals such that second ASSOC(setup) messages are transmitted to only the specified terminals. Any terminal that fails to respond within the predetermined time is marked out-of-service.

Figure 6:
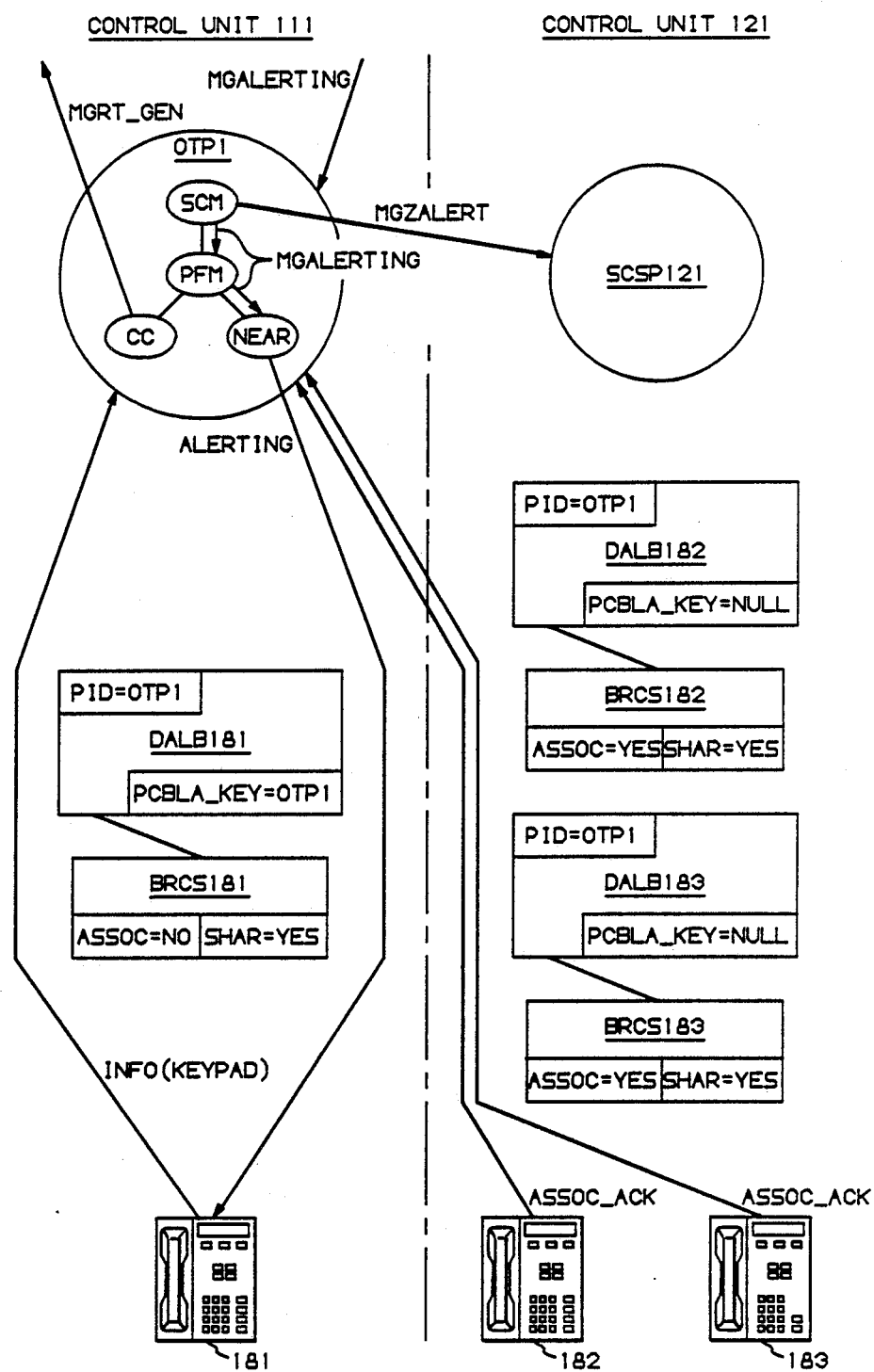

The called DN may be included with the initial SETUP message (FIG. 3, en bloc sending mode) or may be transmitted one digit at a time in INFO(keypad) messages (FIG. 6, overlap sending mode). Contemporaneous with the communication with associated terminals informing them of the origination, model CC transmits a MGRT_GEN message to initiate the routing and terminal allocation function involving translation of the called DN to determine the terminating port of system 100 for the call. (As mentioned previously, this function may be performed with the involvement of administrative module 160 or exclusively by the control units of the switching modules.) When alerting begins at an ISDN terminal at the far end, a MGALERTING message is returned to process OTP1. In response, model SCM transmits a MGALERTING message via model PFM to model NEAR, which in turn transmits an ALERTING message to the calling terminal 181. (In addition, audible alerting may be transmitted in a B-channel to terminal 181.) Model SCM also transmits MGZALERT messages to the SCSPs in the other control units. FIG. 6 shows the MGZALERT message transmitted to process SCSP121 in control unit 121. In response, process SCSP121 transmits ALERTING messages (FIG. 7) to terminals 182 and 183.

Figure 7:
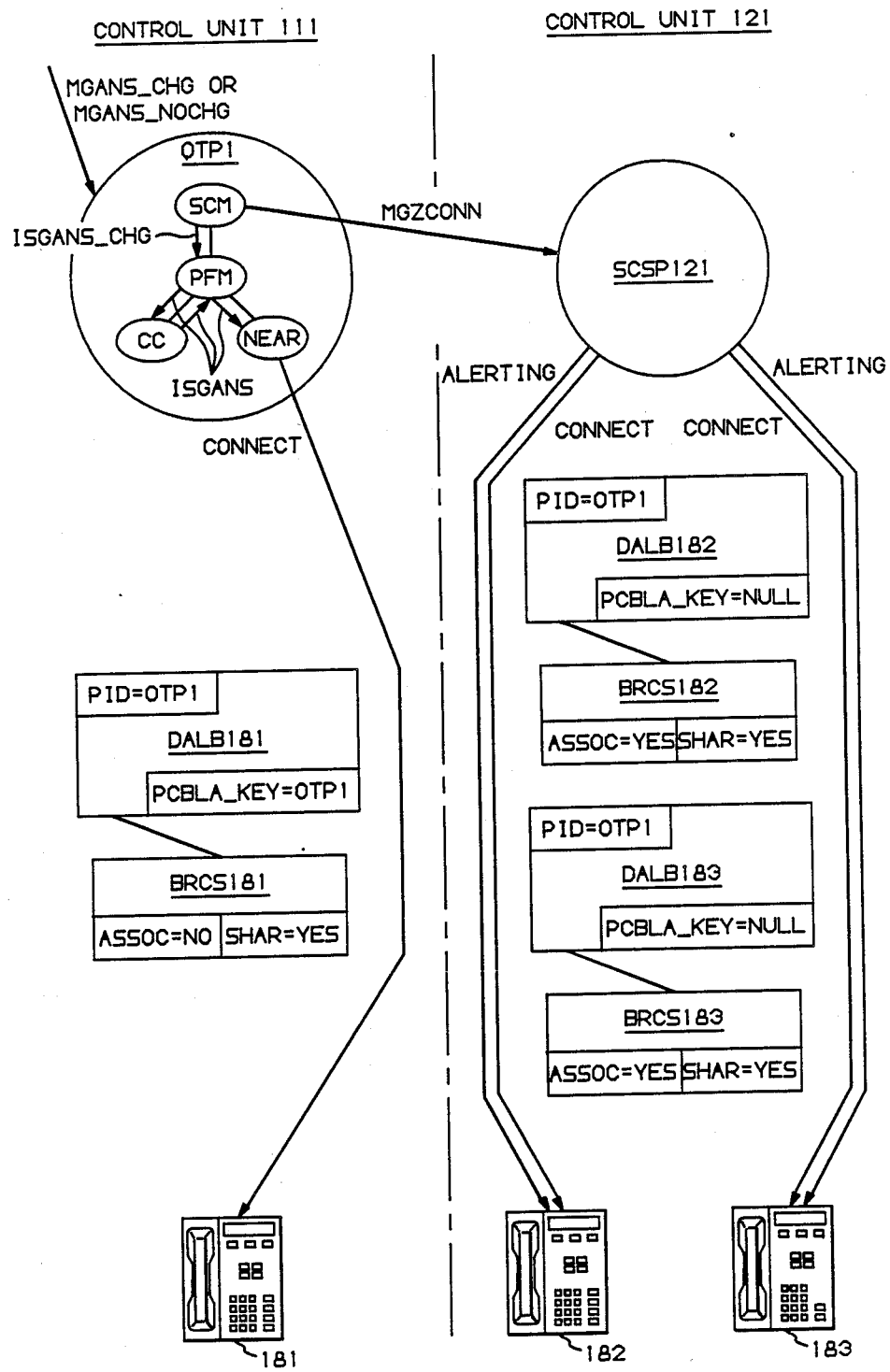

When the call is answered, a message (either MGANS_CHG or MGANS_NOCHG) is returned to process OTP1. Model SCM transmits a MGANS_CHG message to model PFM, which in turn transmits an ISGANS_CHG message to model CC. Model CC then sends an ISGANS message via model PFM to model NEAR. In response, model NEAR transmits a CONNECT message to calling terminal 181. Model SCM also transmits MGZCONN messages to the SCSPs in the other control units. FIG. 7 shows the MGZCONN message transmitted to process SCSP121 in control unit 121. In response, process SCSP121 transmits CONNECT messages to the associated terminals 182 and 183 informing them of the new call state.

Figure 8:
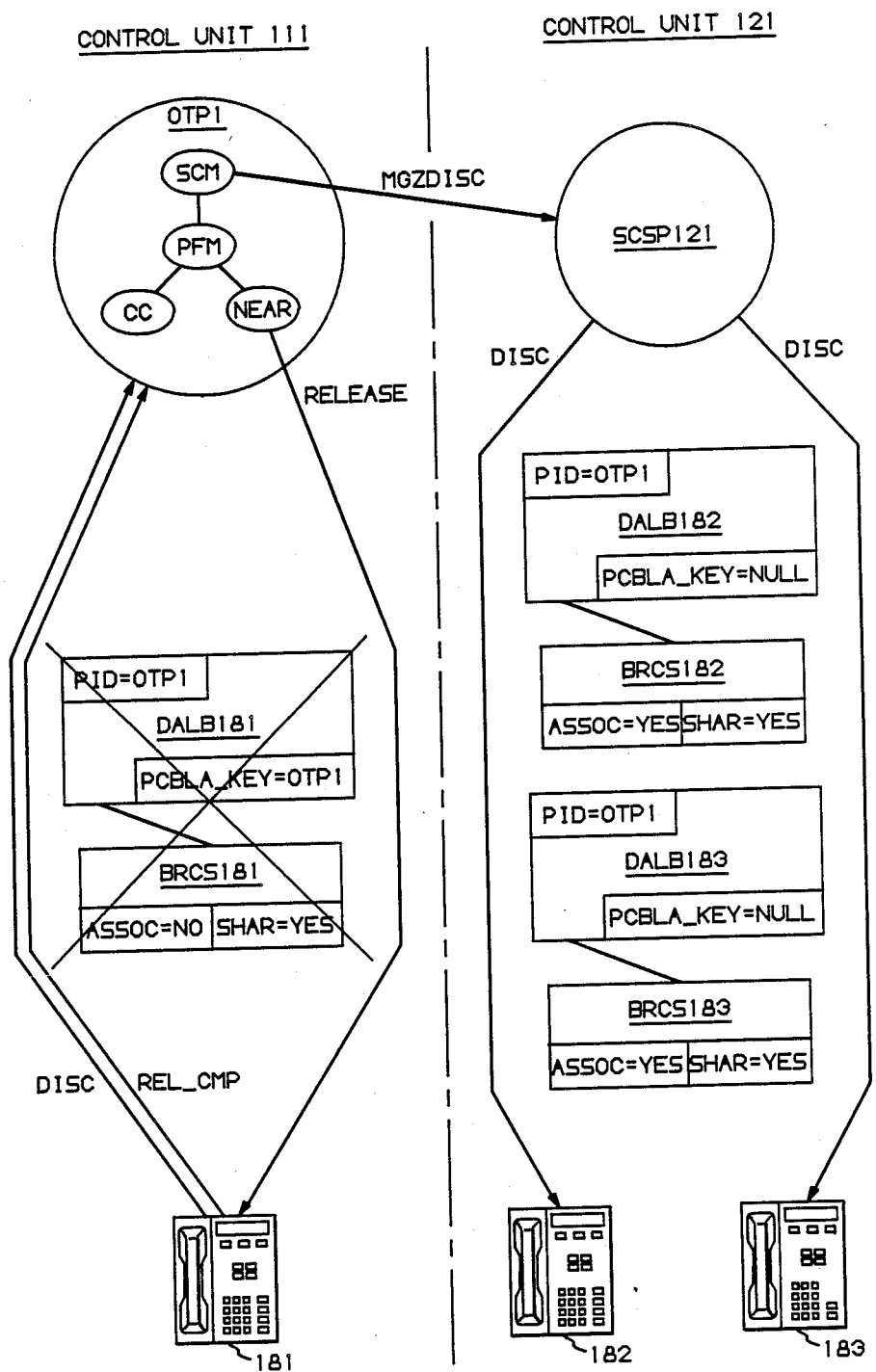
Figure 9:
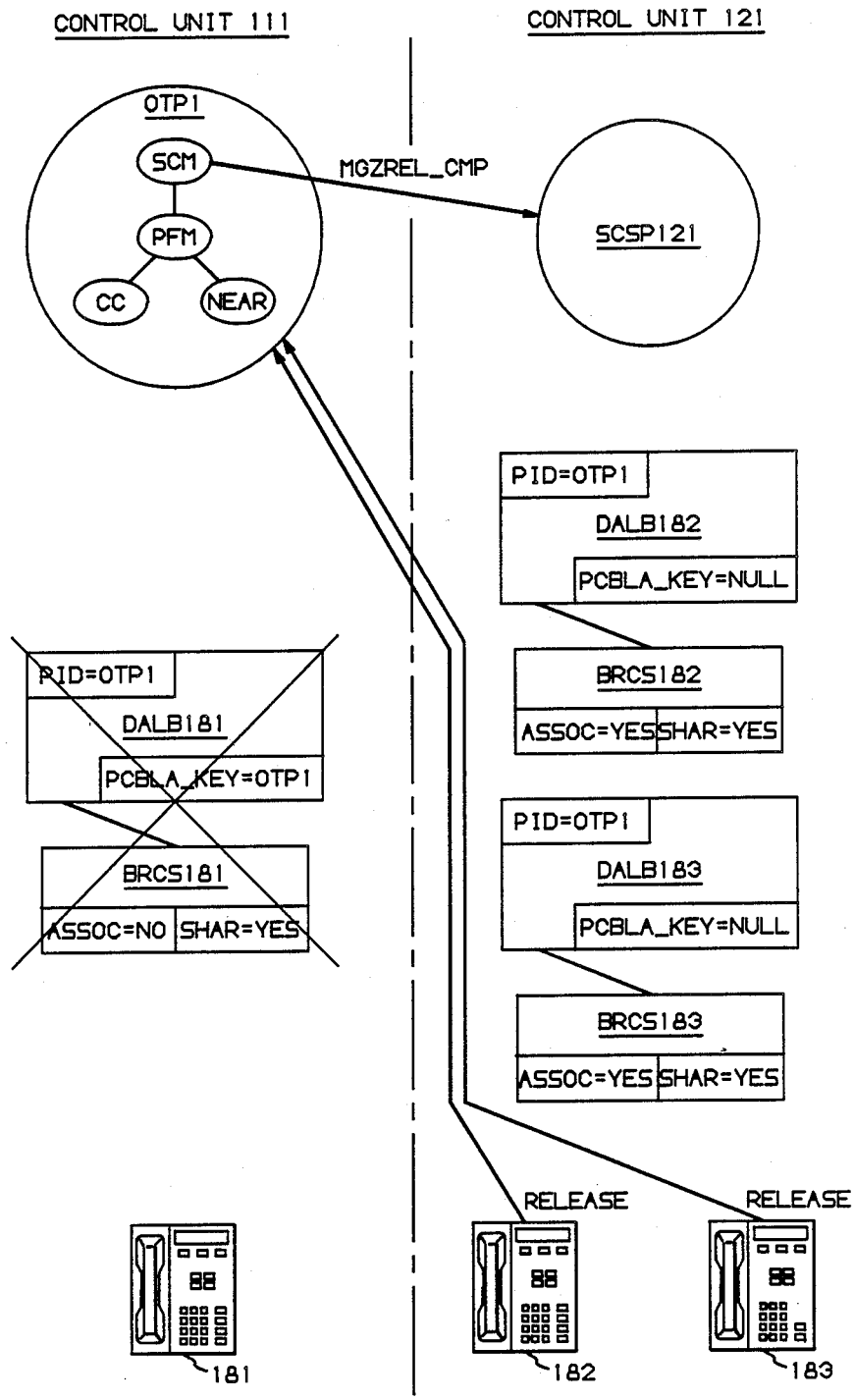
Figure 10:
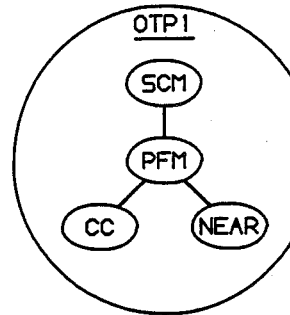
Figure 10:
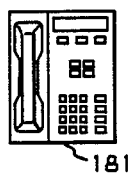
Figure 10:
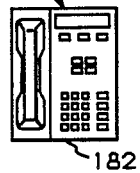
Figure 10:
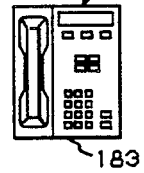
Figure 11:
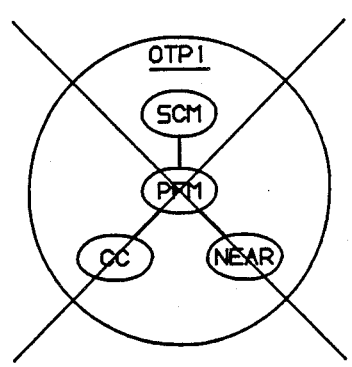
Figure 11:
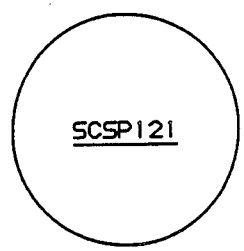
Figure 11:
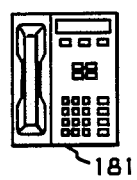
Figure 11:
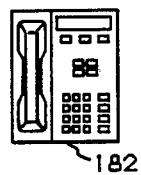
Figure 11:
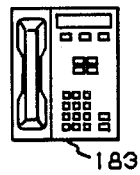

If terminal 181 transmits a DISC message (FIG. 8) to process OTP1 at the end of the call, process OTP1 completes an exchange of RELEASE and REL_CMP messages with terminal 181. At this point the blocks DALB181 and BRCS181 are released. However, the call appearance CA1 of DN2 is not idled in the busy/idle table 126 (FIG. 1) and the originating terminal process OTP1 remains since all of the terminals of the group have not completed release procedures. Process OTP1 transmits a MGZDISC message to the SCSPs in the other control units. FIG. 8 shows the MGZDISC message transmitted to process SCSP121 in control unit 121. In response, process SCSP121 transmits DISC messages to the associated terminals 182 and 183, which respond with RELEASE messages (FIG. 9) back to process OTP1. When all the associated terminals of the group on module 120 have returned RELEASE messages (in this case, terminals 182 and 183), process OTP1 transmits a MGZREL_CMP message to process SCSP121 in control unit 121. In response, process SCSP121 transmits REL_CMP messages (FIG. 10) to the associated terminals 182 and 183, and the blocks DALB182, BRCS182, DALB183, and BRCS183 are released. Process SCSP121 also returns a MGZIDLED message back to process OTP1. When process OTP1 has received MGZIDLED messages from the SCSPs of all the other control units of the group, process OTP1 returns a MGZLTMID message to the SCSP of only the lead control unit, process SCSP121 of control unit 121. At this point, the status of DN2, CA1 in the busy/idle table 126 (FIG. 1) is returned to idle. Process SCSP121 returns a MGZFIN message to process OTP1 and process OTP1 is terminated (FIG. 11).

Figure 12:
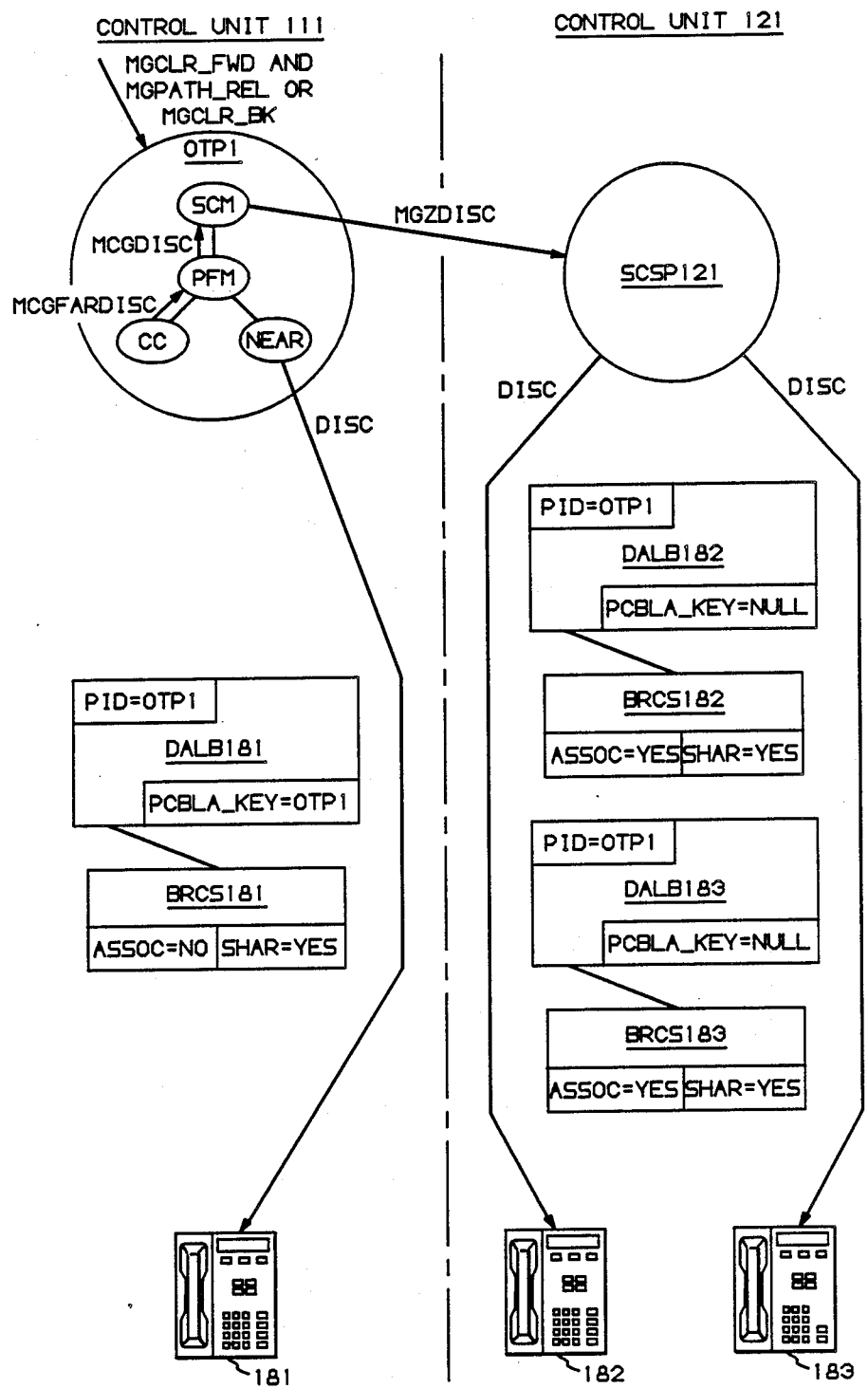
Figure 13:
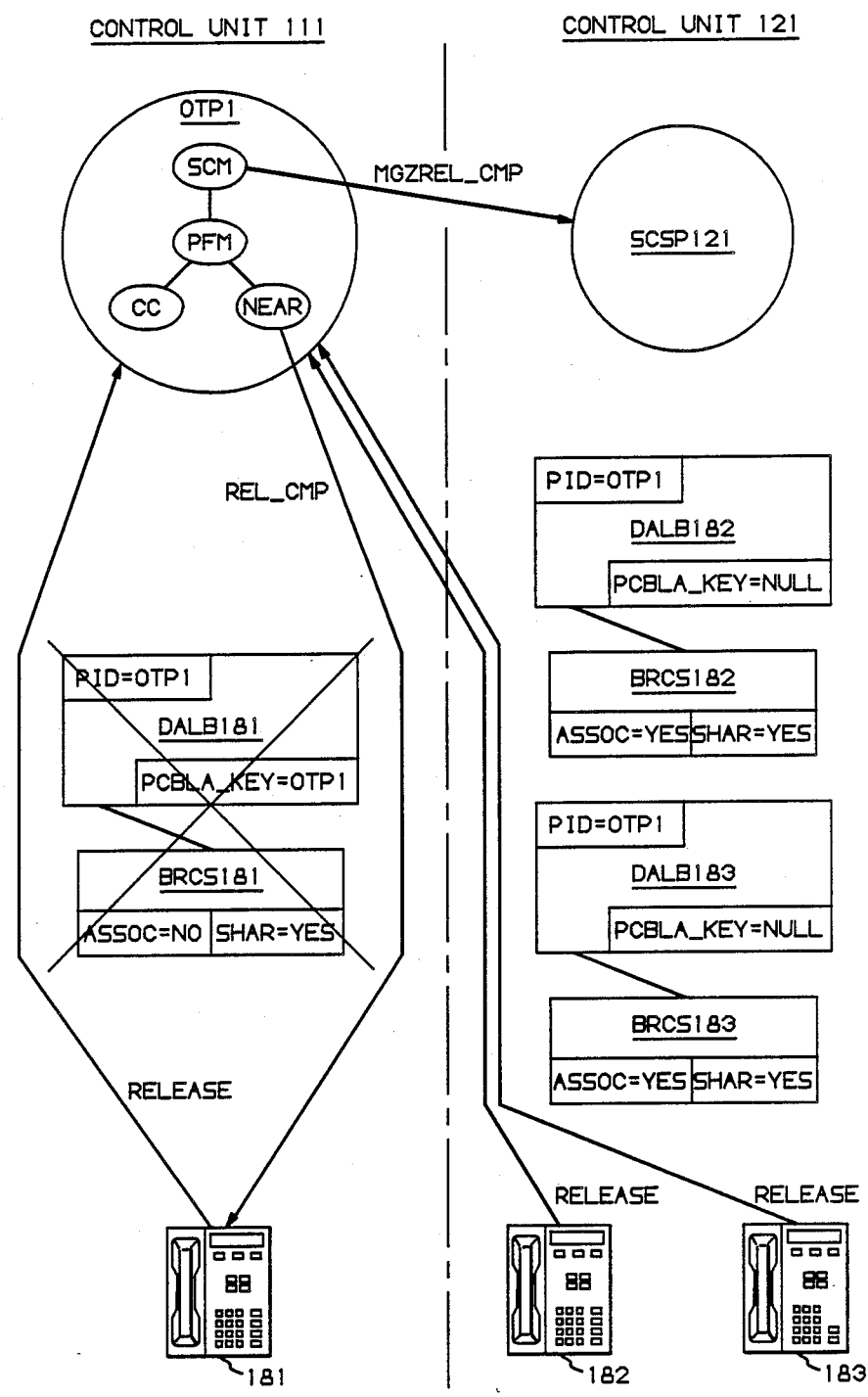
Figure 14:
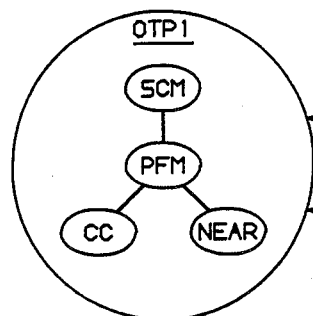
Figure 14:
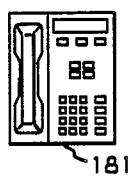
Figure 14:
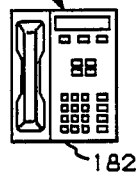
Figure 14:
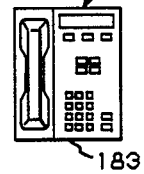
Figure 15:
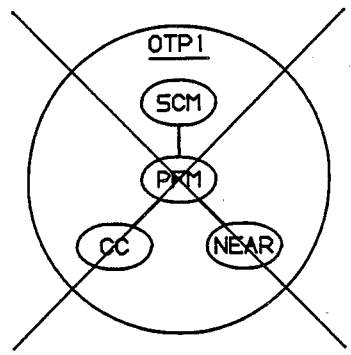
Figure 15:
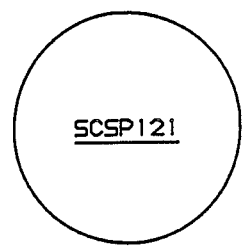
Figure 15:
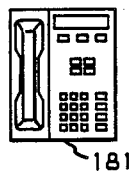
Figure 15:
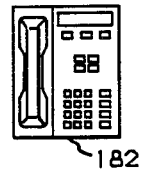
Figure 15:
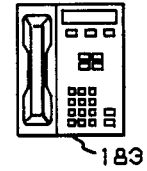

If the far party disconnects, a message (MGCLR_FWD and MGPATH_REL or MGCLR_BK) is returned to model CC of process OTP1, and MCGFARDISC and MCGDISC messages are in turn conveyed to models PFM and SCM, respectively. Process OTP1 subsequently transmits a DISC message to terminal 181 and a MGZDISC message to the SCSP of each of the other control units. FIG. 12 shows the MGZDISC message transmitted to process SCSP121 of control unit 121. Process SCSP121 subsequently transmits DISC messages to the associated terminals 182 and 183. Each of the terminals of the group, 181, 182, 183 returns a RELEASE message (FIG. 13) to process OTP1. Process OTP1 returns a REL_CMP message to terminal 181 and blocks DALB181 and BRCS181 are released. When all of the associated terminals on a given module have responded, process OTP1 returns a MGZRELCMP message to the SCSP of the control unit of that module. As shown in FIG. 13, when terminals 182 and 183 have returned RELEASE messages, process OTP1 transmits a MGZREL_CMP message to process SCSP121 Process SCSP121 then transmits REL_CMP messages (FIG. 14) to terminals 182 and 183, and the blocks DALB182, BRCS182, DALB183, and BRCS183 are released. Process SP121 also returns a MGZIDLED message back to process OTP1. When process OTP1 has received MGZIDLED messages from the SCSPs of all the other control units of the group, process OTP1 returns a MGZLTMID message to the SCSP of only the lead control unit, process SCSP121 of control unit 121. At this point, the status of DN2, CA1 in the busy/idle table 126 (FIG. 1) is returned to idle. Process SCSP121 returns a MGZFIN message to process OTP1 and process OTP1 is terminated (FIG. 15).

Figure 16:
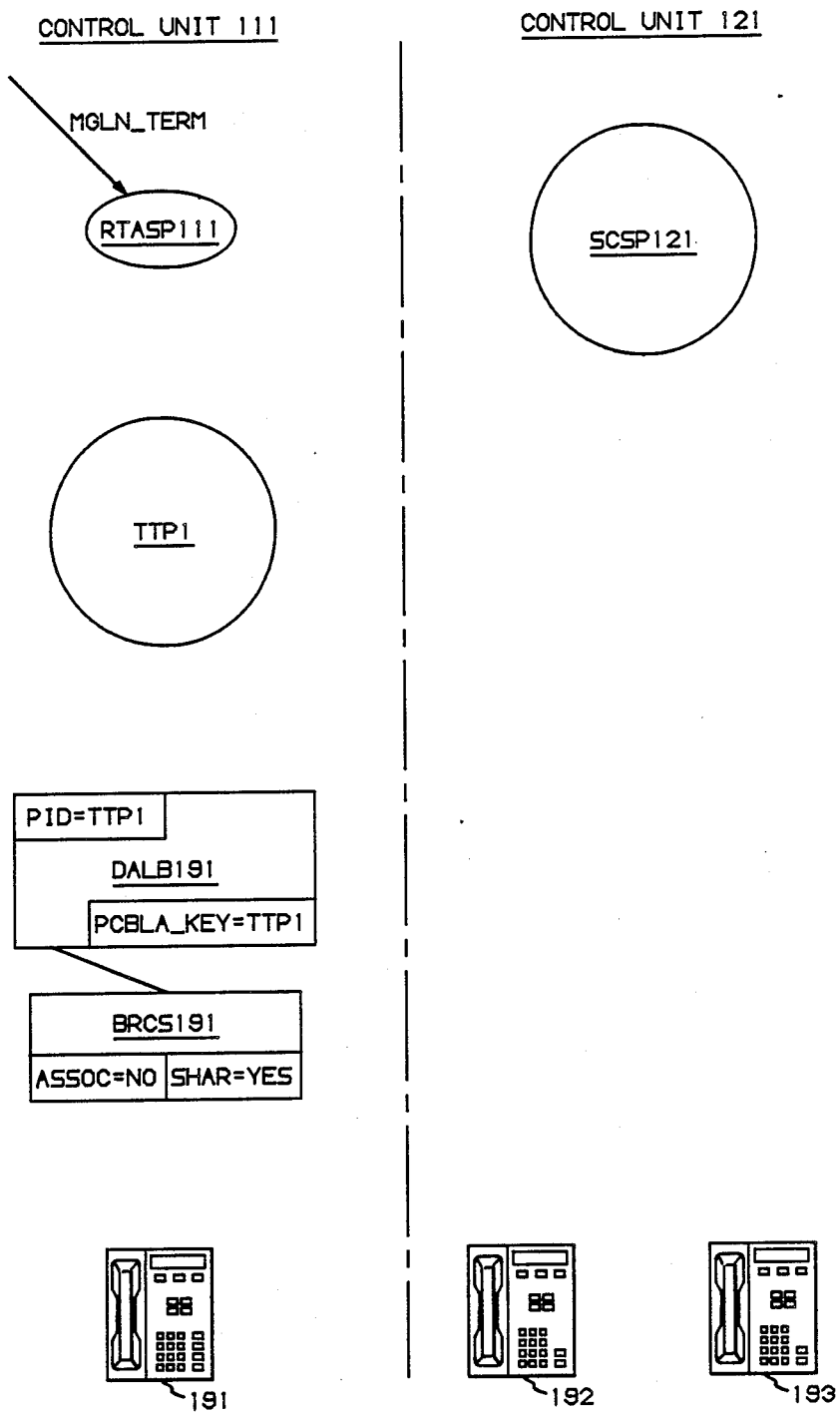
FIGS. 16 through 21 are functional diagrams illustrating the processing of terminating key-system calls by the distributed control units of the system of FIG. 1.
Figure 17:
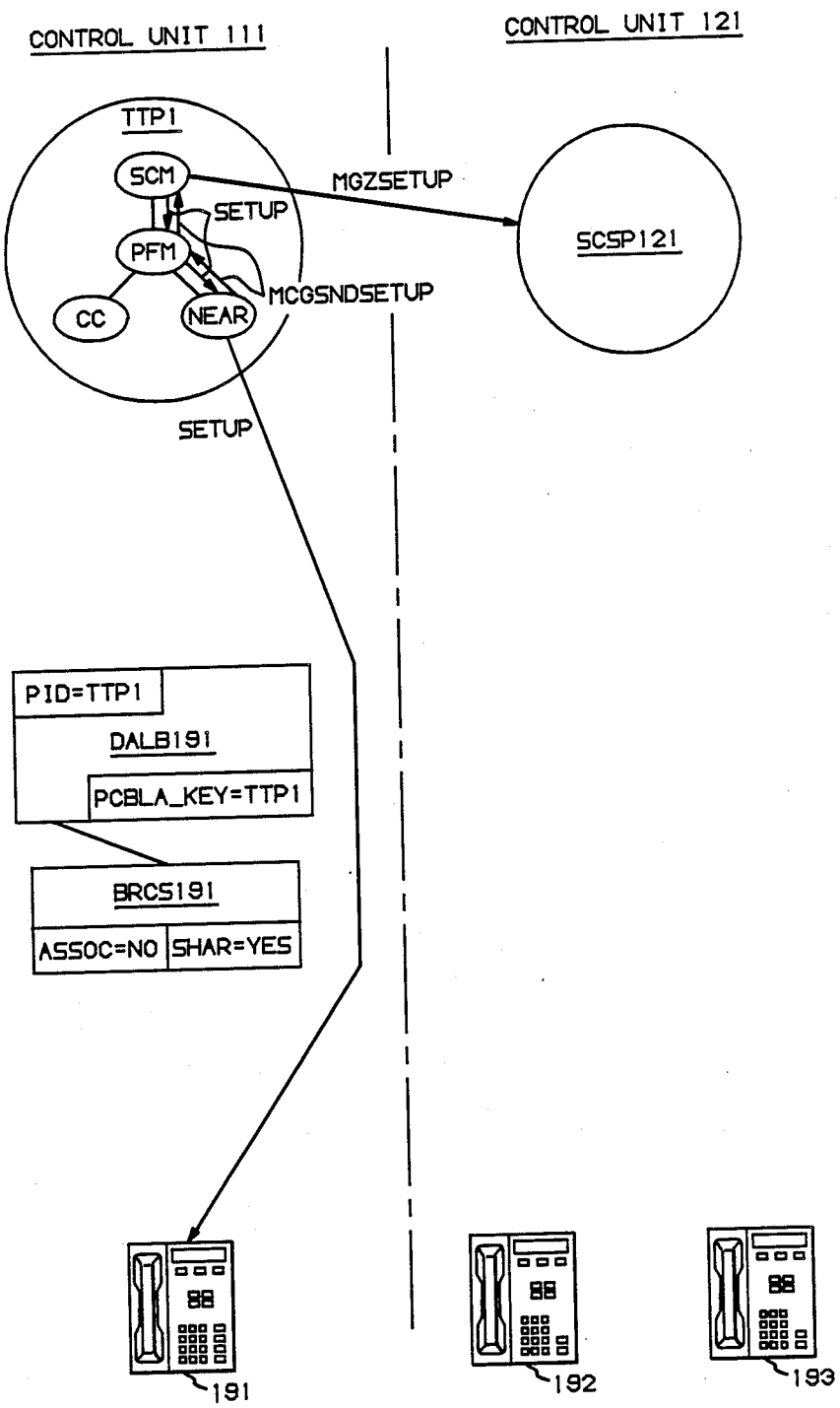

The call processing events associated with call terminations to a key-system group are now described with reference to an exemplary call to DN11. A translation of the called directory number DN11 results in a determination of the system 100 port connected to terminal 191 since terminal 191 is the lead terminal for key-system group 190 (FIG. 1) having the shared directory number, DN11. As a result of the translation, a MGLN_TERM message (FIG. 16) is received by a routing and terminal allocation (RTA) system process RTASP111, in control unit 111. System 100 (FIG. 1) initially assumes that terminal 191 will answer the call and an initial system 100 connection is controlled through the time-slot interchange units of the originating and terminating switching modules and through communications module 150 from the originating terminal to terminal 191. (If the call is an intra-module call, only a connection through the time-slot interchange unit of the module is required.) However, the final connection through ISLU 112 to terminal 191 is not completed until answer occurs. Process RTASP111 effects a reading of busy/idle table 116 (FIG. 1) to determine if an idle call appearance is available. Assume that call appearance CA1 is available. The status of call appearance CA1 is changed from idle to busy in busy/idle table 116 and a terminating terminal process TTP1 (FIG. 16) is created in control unit 111. In addition, the data blocks DALB191 and BRCS191 are created. Since the call appearance is shared (as defined by the variable shar in block BRCS191), process TTP1 includes a shared call model SCM (FIG. 17) in addition to the models PFM, NEAR, and CC. Model SCM transmits a SETUP message via models PFM and NEAR to terminal 191. Model NEAR returns a MCGSNDSETUP message via model PFM to model SCM. In response, model SCM transmits a MGZSETUP message to a shared call system process in each control unit associated with the associated terminals of key-system group 190. In FIG. 17, the MGZSETUP message transmitted to process SCSP121 is shown. In response to the MGZSETUP message, process SCSP121 allocates, links and initializes blocks DALB192, BRCS192, DALB193, and BRCS193 (FIG. 18) for the associated terminals 192 and 193. Process SCSP121 also transmits SETUP messages to terminals 192 and 193. Terminals 191, 192, 193 respond to the SETUP messages by alerting and returning CALL_PROC or ALERTING messages to process TTP1.

At the time that process TTP1 transmitted the MGZSETUP message to process SCSP121 (FIG. 17), process TTP1 initialized a timer. If any of the associated terminals of the group have not returned acknowledging messages (CALL_PROC or ALERTING) within a predetermined time, four seconds, process TTP1 transmits second MGZSETUP messages the SCSPs of the non-acknowledging terminals and reinitializes the timer. The second MGZSETUP messages specify the non-acknowledging terminals such that second SETUP messages are transmitted to only the specified terminals. Any terminal that fails to respond within the predetermined time is marked out-of-service.

Figure 19:
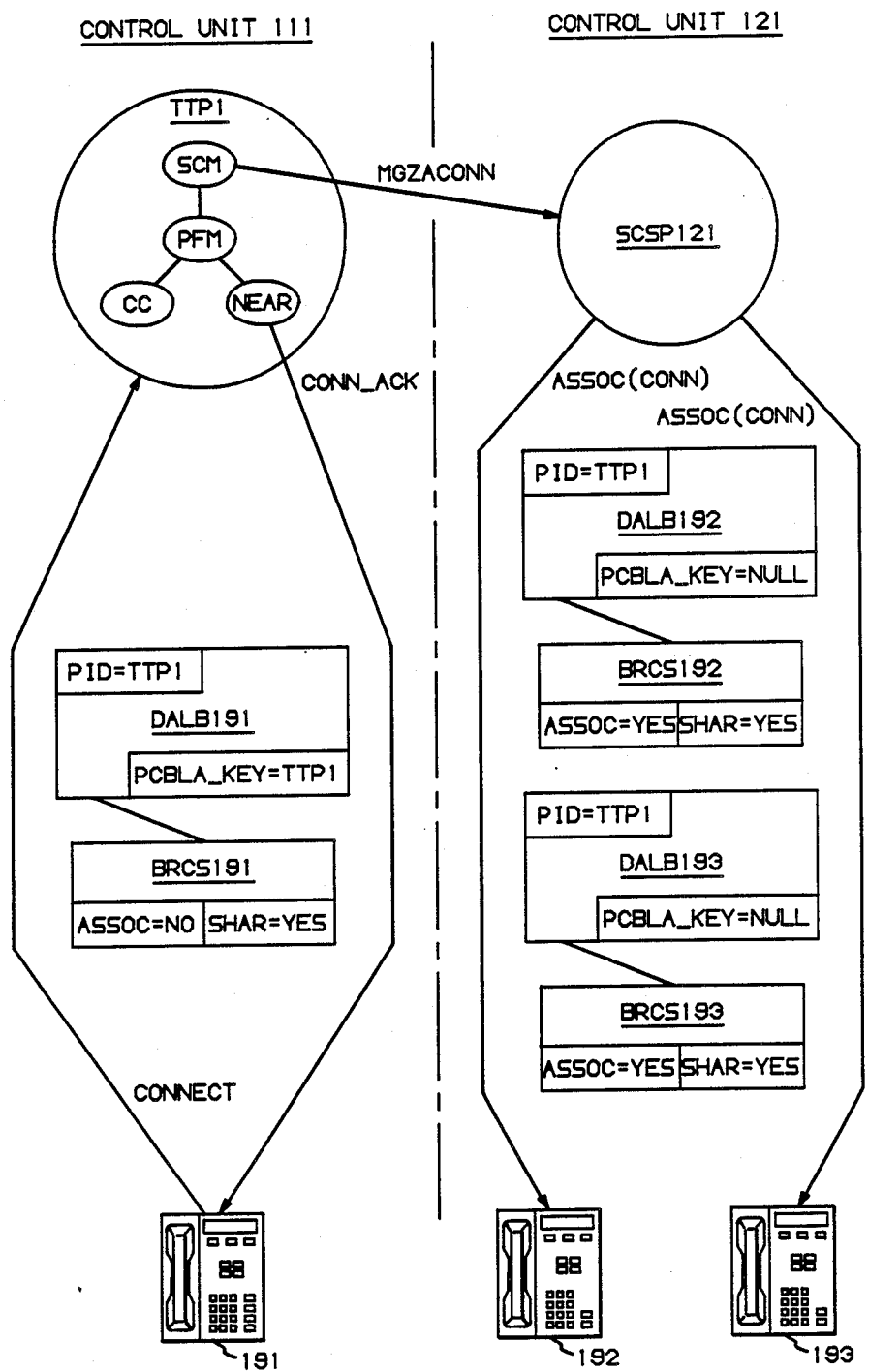

As a first scenario, assume that lead terminal 191 is the first to answer the call. Terminal 191 transmits a CONNECT message (FIG. 19) to process TTP1. In response, a CONN_ACK message is returned to terminal 191, the connection through ISLU 112 to terminal 191 is completed, and voice communication can be initiated. Model SCM transmits a MGZACONN message to the SCSPs of the other control units. FIG. 19 shows the MGZACONN message transmitted to process SCSP121 in control unit 121. In response to the MGZACONN message, process SCSP121 transmits ASSOC(conn) messages to the associated terminals 192 and 193 informing them of the new call state.

Figure 20:
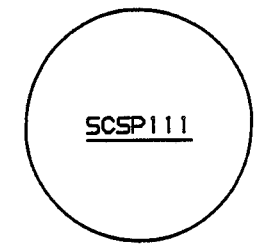
Figure 20:
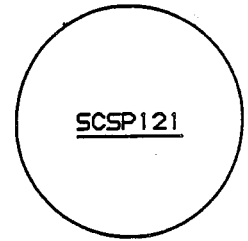
Figure 20:
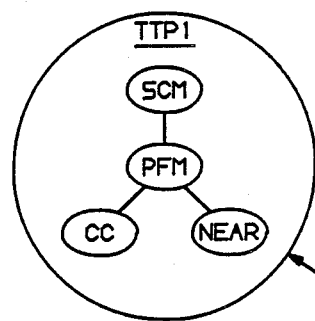
Figure 20:
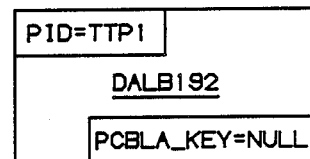
Figure 20:
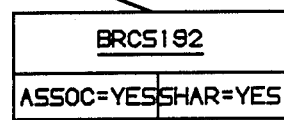
Figure 20:
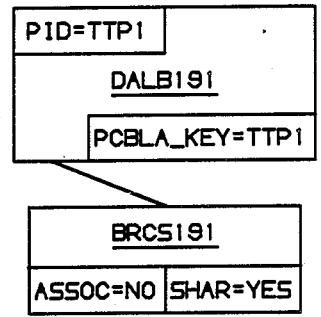
Figure 20:
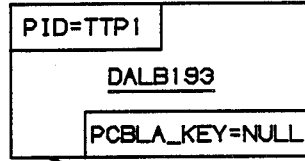
Figure 20:
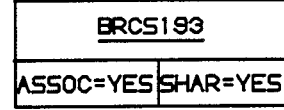
Figure 20:
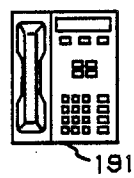
Figure 20:
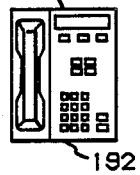
Figure 20:
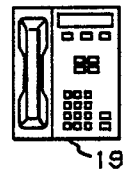
Figure 21:
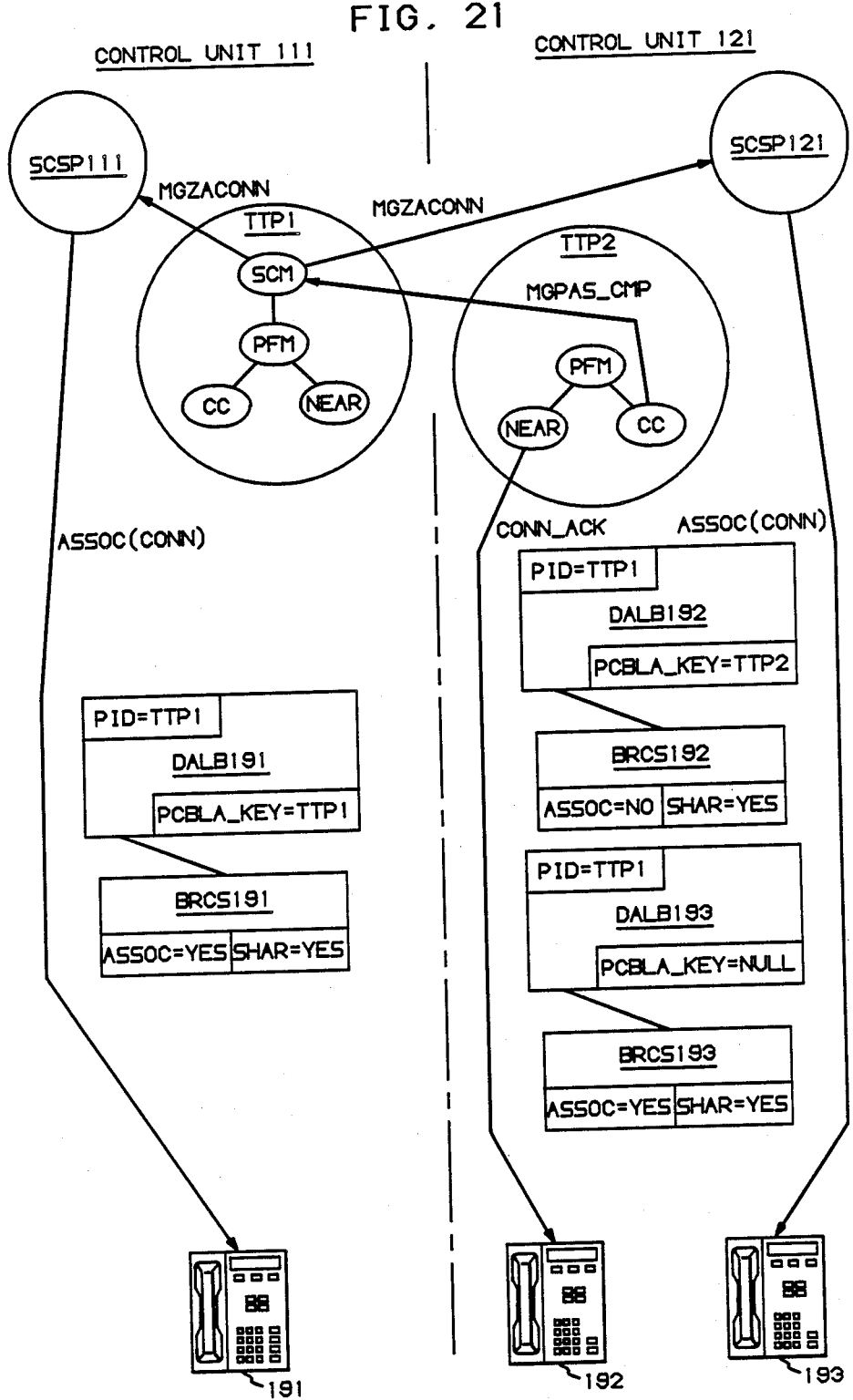

As a second scenario, assume that non-lead terminal 192 is the first to answer the call. Terminal 192 transmits a CONNECT message (FIG. 20) to process TTP1 via a message communication process (not shown) in control unit 121. In response to the CONNECT message, process TTP1 effects an initiation of a routing procedure such that a terminating terminal process TTP2 (FIG. 21) is created in control unit 121. The variable assoc in block BRCS192 is changed to define that terminal 192 is no longer an associated terminal with respect to the call, and the variable pcbla_key in block DALB192 is changed to define that process TTP2 is now associated with terminal 192. In addition, the initial system 100 connection to lead terminal 191 is removed, and a second system 100 connection is controlled to non-lead terminal 192. Model NEAR of process TTP2 transmits a CONN_ACK message to terminal 192. After the system 100 connection is completed to terminal 192, model CC of process TTP2 returns a MGPAS_CMP message to model SCM of process TTP1. In response, model SCM of process TTP1 transmits a MGZACONN message to the SCSP of each of the control units having associated terminals for the call. FIG. 21 shows the MGZACONN messages transmitted to process SCSP111 in control unit 111 and process SCSP121 in control unit 121. In response to the MGZACONN messages, process SCSP121 transmits an ASSOC(conn) message to terminal 193 and process SCSP111 transmits an ASSOC(conn) message to terminal 191. The variable assoc in block BRCS191 is changed to define that terminal 191 is now an associated terminal with respect to the call.

Focusing the control of the call in the shared call model SCM of the terminating terminal process assures that only one terminal is allowed to initially answer the call, although a second terminal can be subsequently bridged onto the connection as described herein.

When a call to a key-system group is placed on HOLD at one terminal, retrieval from HOLD can be effected at another terminal. When this occurs the system 100 connection has be moved to the second terminal in a manner similar to that just described for the case when the non-lead terminal is the first to answer an incoming call.

Key-system groups can include one analog terminal in addition to one or more digital, ISDN terminals. For such analog key-system groups, the analog terminal is always the lead terminal for the group. Analog terminals have only one call appearance. Since the lead terminal must have the maximum number of call appearances for a key-system group, each of the members of an analog key-system group has only one call appearance of the shared DN. Of course the communication between the analog terminal and system 100 is effected using stimulus signaling, on-hook/off-hook detection, etc., rather than via digital message exchanges. When an ISDN terminal in an analog key-system group is originating a call, an analog data block (ADB) is allocated in the control unit associated with the analog terminal. The ADB is used for directing communication to and from the originating terminal process concerning the analog terminal. Disconnect timing is typically performed for analog terminals, so that a called analog terminal can hang up and still remain connected if the terminal again goes off-hook within ten seconds. When an analog terminal is a member of a key-system group, bridging requests from ISDN terminals in the group are denied during the disconnect timing interval.

Any time a terminal of a key-system group is active on a call, one additional terminal of the group can bridge onto the call. If two terminals attempt to bridge at the same time, the first terminal's RECONNECT message is accepted while the second terminal is sent a RECONN_REJ message. Bridging is allowed for both originations and terminations. When a user at a key-system group terminal goes off-hook having selected a call appearance that currently supports a stable call, ringing or talking, the terminal is bridged onto the call provided that: (1) a conference does not already exist on this end of the call, (2) manual exclusion, a feature which can be activated using one of the terminal feature buttons or an activation code to afford a degree of privacy to the group member, has not been activated for the call, (3) a conference circuit is available, and (4) the conference circuit limit, for example three parties on a call, has not been exceeded.

The scenario is as follows. A key-system group user goes off-hook on a selected call appearance of the shared DN. The bridging user's terminal sends a RECONN message (for the Call Reference Value currently associated with the call appearance) to system 100. The terminal has previously received an ASSOC(setup or conn) message for the call appearance. If the call is in a stable state and the four above-listed conditions are met, system 100 responds with a RECONN_ACK message, indicating the choice of B-channels for the call. Otherwise, system 100 transmits a RECONN_REJ message to the terminal with the appropriate cause element. System 100 then connects the bridging party to the currently talking parties using a conference circuit (not shown).

Bridging is allowed between analog and ISDN terminals of a key-system group. The procedures are the same as between two ISDN terminals except that the analog terminal signals system 100 that bridging is desired by going off-hook on a DN which is active at an ISDN terminal. In addition, if bridging is denied to the analog terminal, busy tone is returned.

As long as there remains at least one terminal of a key-system group active on a call, the call is not discontinued. When a bridged terminal disconnects (either by sending a DROP message or a DISC message to system 100), the clearing of the path to the disconnecting party does not affect the other talking parties.

Figure 18:
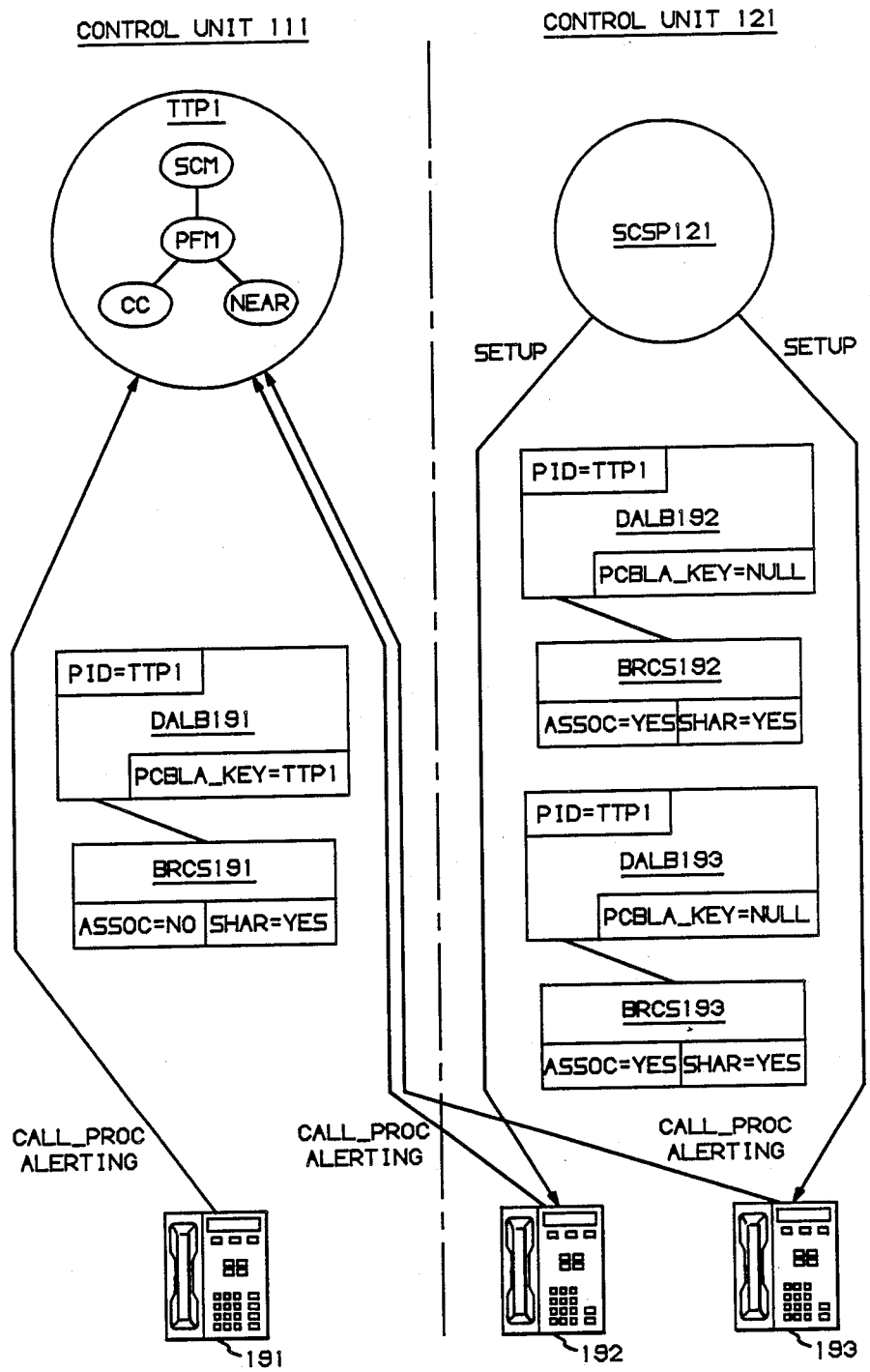
Figure 22:
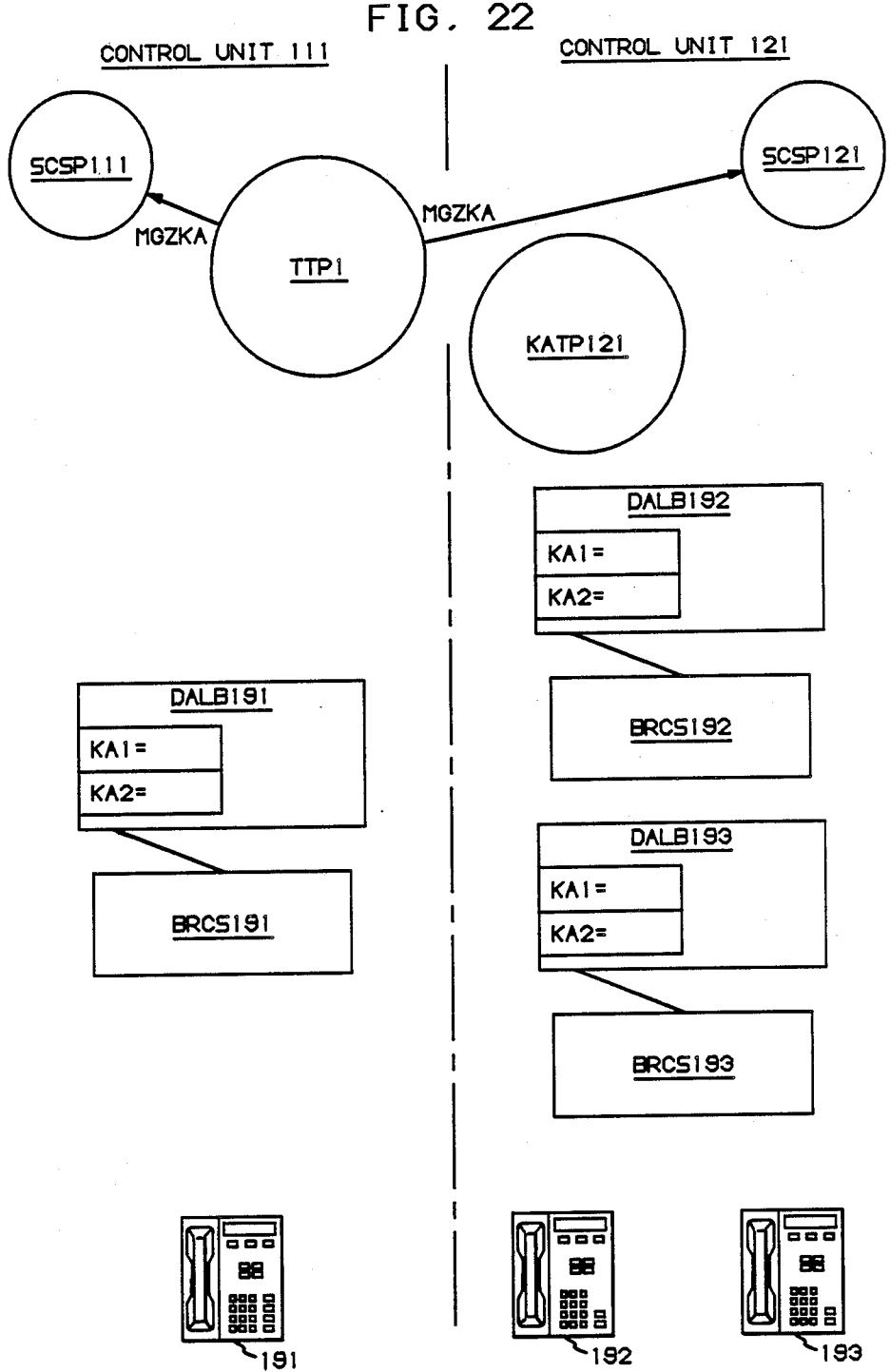
FIGS. 22 and 23 are a functional diagram and associated program flow chart for an audit mechanism used between the distributed control units of the system of FIG. 1.

A cross-processor or cross-module audit mechanism referred to herein as a keep-alive mechanism is effected to assure that: (1) all DALB and BRCS blocks that are not released are associated with active calls, and (2) all group ISDN terminals which the shared call model controlling a call half considers operational have DALB and BRCS blocks associated therewith. Consider the call termination example discussed above with respect to FIGS. 16 through 21. The configuration shown in FIG. 18 is repeated in FIG. 22. The keep-alive mechanism is implemented as follows. Every five minutes, process TTP1 transmits MGZKA messages to each of the SCSPs of the key-system group. FIG. 22 shows the MGZKA messages transmitted to process SCSP111 in control unit 111 and process SCSP121 in control unit 121. In response to the MGZKA messages, the SCSP processes set a variable KA1 in the DALB block of each of the terminals of the group. In addition, each SCSP creates a keep-alive terminal process every five minutes to run an audit program (FIG. 23) for every DALB and BRCS block of that control unit. For example, process SCSP121 creates process KATP121 which runs the audit program for all the DALB and BRCS blocks of control unit 121, specifically blocks DALB192, BRCS192, DALB193, and BRCS193 shown in FIG. 22, and, in addition, DALB and BRCS blocks associated with terminals in other key-system groups.

Figure 23:
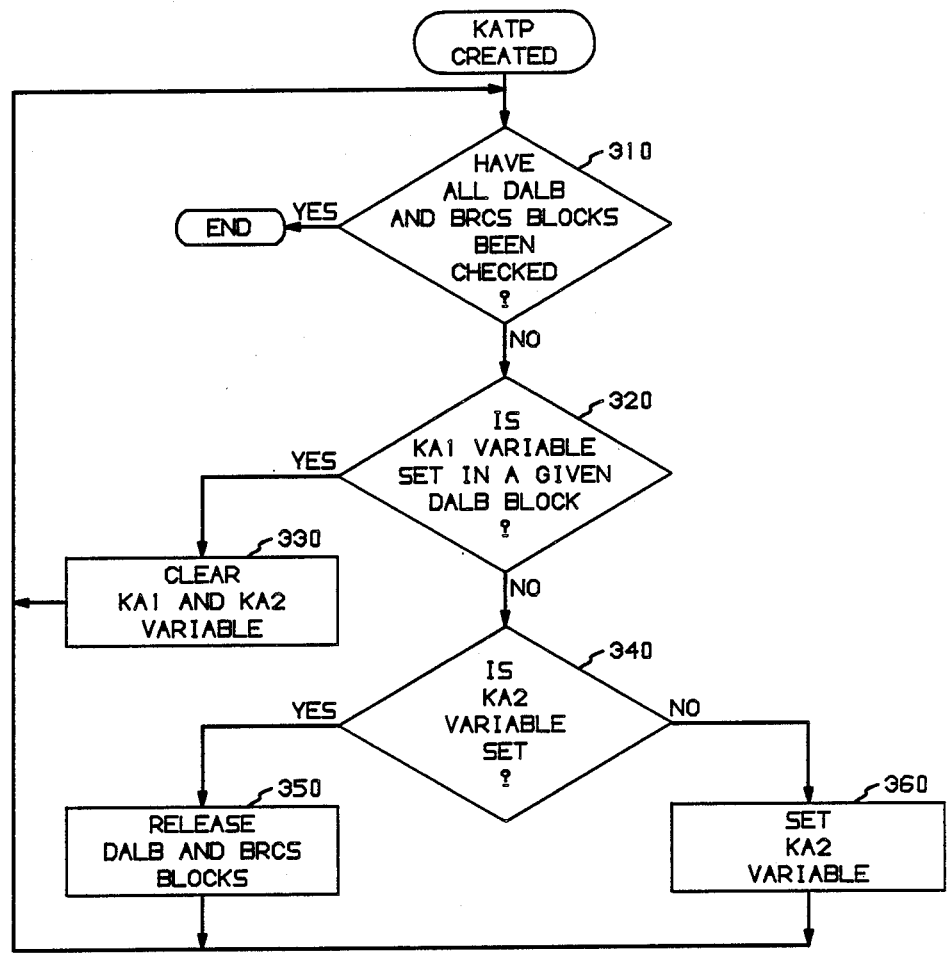

A flow-chart of the audit program run by process KATP121 is shown in FIG. 23. Execution begins with block 310 and a determination is made of whether all DALB and BRCS blocks have been checked. If not, execution proceeds to block 320 and the variable KA1 of a given DALB block, for example block DALB192, is checked to determine whether the variable KA1 is set. If variable KA1 is set, execution proceeds to block 330 and the variables KA1 and KA2 are both cleared. If, on the other hand, the variable KA1 is not set, execution proceeds from block 320 to block 340, where a check is made to determine whether the variable KA2 is set. If the variable KA2 is not set, execution proceeds to block 360, and the variable KA2 is set. However, if the check made in block 340 determines that the variable KA2 is set, indicating that it has been more than five minutes since the variable KA1 in block DALB192 has been set in response to a MGZKA message from TTP1, execution proceeds to block 350 where blocks DALB191 and BRCS191 are released. The audit is repeated for each of the DALB and BRCS blocks of control unit 121. The two-pass check mechanism using two variables KA1 and KA2 assures that differences between the five-minute timers in processes TTP1 and SCSP121 do not result in inadvertent release of the DALB and BRCS blocks.

If in response to the MGZKA message from process TTP1, process SCSP121 determines that there are no DALB and BRCS blocks for a terminal of the group even though that terminal is still considered to be in-service, process SCSP121 returns a MGZDEAD message to process TTP1 defining the anomaly. In response, the model SCM of process TTP1 controls a reallocation of DALB and BRCS blocks for that terminal and brings the terminal up to the present call state, so that bridging is again possible.

What is claimed is:

1. In a distributed control switching system connectable to a plurality of terminals, said system comprising a plurality of control units each associated with a different subset of said terminals and for controlling connections to and from its associated subset of said terminals, a method of processing calls to and from a directory number shared by a key-system group of said terminals associated with multiple ones of said control units, said method comprising a lead one of said multiple control units maintaining busy/idle data for said shared directory number, in response to said calls, said lead control unit reading said data, in response to said read data, said multiple control units cooperatively processing said calls, and during each of said calls, said multiple control units cooperatively informing said group of terminals of the status of said each call.

2. A method in accordance with claim 1 wherein said processing step comprises for an originating call from said shared directory number of an originating one of said terminals of said group, initiating processing of said originating call by an originating one of said multiple control units that is associated with said originating terminal.

3. A method in accordance with claim 2 further comprising completing a connection of said system from said originating terminal to a terminating one of said plurality of terminals.

4. A method in accordance with claim 3 further comprising after said completing step and in response to a signal from a terminal of said group other than said originating terminal, bridging said other terminal and said originating terminal for conference connection to said terminating terminal.

5. A method in accordance with claim 2 wherein said informing step comprises said originating control unit transmitting an acknowledgment of said originating call to said originating terminal, said originating control unit transmitting, to another one of said multiple control units, a setup message defining said originating call, and in response to said setup message, said another control unit transmitting, to any of its associated subset of terminals included in said group, a signal for said originating call.

6. A method in accordance with claim 5 further comprising contemporaneously with transmitting said setup message, said originating control unit initiating a timer, in response to a failure to receive acknowledgement, from each of said terminals associated with said another control unit and included in said group, within a predetermined time of initiating said timer, said originating control unit transmitting a second setup message to said another control unit specifying each non-acknowledging terminal, and in response to said second setup message, said another control unit transmitting a second signal for said originating call to said each specified terminal.

7. A method in accordance with claim 6 further comprising contemporaneously with transmitting said second setup message, said originating control unit reinitiating said timer, and in response to a failure to receive acknowledgement, from each of said specified terminals within a predetermined time of reinitiating said timer, said lead control unit storing status information defining each non-acknowledging one of said specified terminals as out-of-service.

8. A method in accordance with claim 2 further comprising in response to setup signals from a plurality of terminals of said group, completing a connection of said system from only one of said plurality of terminals of said group.

9. A method in accordance with claim 1 wherein said processing step comprises for a terminating call to said shared directory number, said multiple control units cooperatively offering said terminating call to said group of terminals.

10. A method in accordance with claim 9 further comprising prior to said reading step and in response to said terminating call, performing a translation of said shared directory number to define a lead one of said terminals of said group, said lead terminal being associated with said lead control unit.

11. A method in accordance with claim 10 wherein said terminating call is received from an originating one of said plurality of terminals, said method further comprising in response to said translation, controlling an initial connection of said system from said originating terminal to said lead terminal.

12. A method in accordance with claim 11 further comprising in response to a connect signal from said lead terminal, completing said initial connection to said lead terminal.

13. A method in accordance with claim 12 further comprising after said completing step and in response to a signal from a terminal of said group other than said lead terminal, bridging said other terminal and said lead terminal for conference connection to said originating terminal.

14. A method in accordance with claim 11 further comprising in response to a connect signal from a non-lead one of said terminals of said group, removing said initial connection, and completing a second connection of said system from said originating terminal to said non-lead terminal.

15. A method in accordance with claim 14 further comprising after said completing step and in response to a signal from a terminal of said group other than said non-lead terminal, bridging said other terminal and said non-lead terminal for conference connection to said originating terminal.

16. A method in accordance with claim 9 wherein said offering step comprises said lead control unit transmitting, to any of its associated subset of terminals included in said group, a setup signal for said terminating call, said lead control unit transmitting, to a non-lead one of said multiple control units, a setup message defining said terminating call, and in response to said setup message, said non-lead control unit transmitting, to any of its associated subset of terminals included in said group, a setup signal for said terminating call.

17. A method in accordance with claim 16 further comprising contemporaneously with transmitting said setup message, said lead control unit initiating a timer, in response to a failure to receive acknowledgement, from each of said terminals associated with said non-lead control unit and included in said group, within a predetermined time of initiating said timer, said lead control unit transmitting a second setup message to said non-lead control unit specifying each non-acknowledging terminal, and in response to said second setup message, said non-lead control unit transmitting a second setup signal for said terminating call to said each specified terminal.

18. A method in accordance with claim 17 further comprising contemporaneously with transmitting said second setup message, said lead control unit reinitiating said timer, and in response to a failure to receive acknowledgement, from each of said specified terminals within a predetermined time of reinitiating said timer, said lead control unit storing status information defining each non-acknowledging one of said specified terminals as out-of-service.

19. A method in accordance with claim 9 wherein said offering step comprises said lead control unit transmitting, to an analog terminal included in said group, an analog ringing signal for said terminating call, said lead control unit transmitting, to a non-lead one of said multiple control units, a setup message defining said terminating call, and in response to said setup message, said non-lead control unit transmitting, to a digital terminal included in said group, a digital setup signal for said terminating call.

20. A method in accordance with claim 9 wherein said terminals of said group have a plurality of call appearances of said shared directory number, wherein said offering step comprises in response to said read data, said lead control unit determining an idle one of said plurality of call appearances, and said multiple control units cooperatively offering said terminating call to ones of said group of terminals having said determined call appearance.

21. A method in accordance with claim 9 further comprising in response to connect signals from a plurality of terminals of said group, completing a connection of said system to only one of said plurality of terminals of said group.

22. A distributed control switching system connectable to a plurality of terminals, said system comprising a plurality of control means each associated with a different subset of said terminals and for controlling connections to and from its associated subset of said terminals, said plurality of terminals including a group of terminals associated with multiple ones of said control means and having a shared directory number, a lead one of said multiple control means further comprising means for maintaining busy/idle data for said shared directory number, said lead control means being responsive to calls to and from said shared directory number for reading said data, and said multiple control means being responsive to said read data for cooperatively processing said calls and, for the duration of each of said calls, informing said group of terminals of the status of said each call.

23. A system in accordance with claim 22 wherein an originating one of said multiple control means, associated with a terminal of said group originating a call from said shared directory number, is responsive to said busy/idle data, read by said lead control means in response to said originating call, for initiating processing of said originating call.

24. A system in accordance with claim 22 wherein said multiple control means are responsive to said busy/idle data, read by said lead control means in response to a terminating call to said shared directory number, for cooperatively offering said terminating call to said group of terminals.

* * * * *